US011147113B2

(12) United States Patent
Ezaki et al.

(10) Patent No.: US 11,147,113 B2
(45) Date of Patent: Oct. 12, 2021

(54) GATEWAY APPARATUS, COMMUNICATION METHOD, AND NON-TRANSITORY COMPUTER READABLE MEDIUM STORING PROGRAM

(71) Applicant: NEC CORPORATION, Tokyo (JP)

(72) Inventors: Kei Ezaki, Tokyo (JP); Yuki Nakanishi, Tokyo (JP); Yasuhiro Watanabe, Tokyo (JP)

(73) Assignee: NEC CORPORATION, Tokyo (JP)

( * ) Notice: Subject to any disclaimer, the term of this patent is extended or adjusted under 35 U.S.C. 154(b) by 385 days.

(21) Appl. No.: 16/339,155

(22) PCT Filed: Sep. 25, 2017

(86) PCT No.: PCT/JP2017/034536
§ 371 (c)(1),
(2) Date: Apr. 3, 2019

(87) PCT Pub. No.: WO2018/066402
PCT Pub. Date: Apr. 12, 2018

(65) Prior Publication Data
US 2021/0282199 A1    Sep. 9, 2021

(30) Foreign Application Priority Data

Oct. 4, 2016  (JP) .............. JP2016-196128

(51) Int. Cl.
*H04W 76/12* (2018.01)
*H04W 8/28* (2009.01)
(Continued)

(52) U.S. Cl.
CPC ............. *H04W 76/12* (2018.02); *H04W 8/28* (2013.01); *H04W 76/11* (2018.02); *H04W 88/16* (2013.01)

(58) Field of Classification Search
CPC ....... H04W 76/12; H04W 76/11; H04W 8/28; H04W 88/16
(Continued)

(56) References Cited

U.S. PATENT DOCUMENTS 9,030,991 B2\* 5/2015 Andreasen .......... H04L 12/4633
370/328
2009/0268722 A1\* 10/2009 Gallagher ............... H04W 8/08
370/352
(Continued)

FOREIGN PATENT DOCUMENTS

JP    2014-116720 A    6/2014
JP    2015-043522 A    3/2015
(Continued)

OTHER PUBLICATIONS

Communication dated Jun. 9, 2020, issued by the Japanese Patent Office in application No. 2016-196128.
(Continued)

*Primary Examiner* — Nghi H Ly
(74) *Attorney, Agent, or Firm* — Sughrue Mion, PLLC

(57) ABSTRACT

A gateway apparatus (30) according to the present disclosure is arranged between a node apparatus (20) that performs communication in accordance with a GTP and an S/P-GW (40) or an S/P-GW (50). The gateway apparatus (30) includes a communication unit (31) configured to terminate a GTP message transmitted from the node apparatus (20); a determination unit (32) configured to determine a terminal type of a mobile station associated with the GTP message; and a conversion unit (33) configured to change a transmission source address set in the GTP message transmitted from the node apparatus (20) from an identifier of the node apparatus (20) to a first identifier of the gateway apparatus (30), in which the communication unit (31) transmits, to the S/P-GW (40) or the S/P-GW (50) determined in accordance
(Continued)

with the terminal type, the GTP message in which the transmission source address has been converted.

8 Claims, 20 Drawing Sheets

(51) Int. Cl.
   *H04W 88/16* (2009.01)
   *H04W 76/11* (2018.01)

(58) Field of Classification Search
   USPC ............... 370/329, 328, 338, 341, 345, 350
   See application file for complete search history.

(56) References Cited

U.S. PATENT DOCUMENTS

| | | | | |
|---|---|---|---|---|
| 2012/0014352 A1* | 1/2012 | Giaretta | ............... | H04W 76/11 370/331 |
| 2014/0160940 A1 | 6/2014 | Maehara et al. | | |
| 2015/0023303 A1* | 1/2015 | Qiang | ................... | H04W 12/06 370/329 |

FOREIGN PATENT DOCUMENTS

| | | |
|---|---|---|
| JP | 2015-50772 A | 3/2015 |
| WO | 2015/122178 A1 | 8/2015 |
| WO | 2016/148197 A1 | 9/2016 |

OTHER PUBLICATIONS

Hiroki Baba et al., "A Study of Core Network Selection Mechanism on multi-EPC environments", IEICE Technical Report, Oct. 10, 2013, 11 pgs., vol. 113, No. 244.

International Search Report for PCT/JP2017/034536 dated, Dec. 12, 2017 (PCT/ISA/210).

* cited by examiner

GATEWAY APPARATUS, COMMUNICATION METHOD, AND NON-TRANSITORY COMPUTER READABLE MEDIUM STORING PROGRAM

CROSS REFERENCE TO RELATED APPLICATIONS

This application is a National Stage of International Application No. PCT/JP2017/034536 filed Sep. 25, 2017, claiming priority based on Japanese Patent Application No. 2016-196128, filed Oct. 4, 2016, the disclosure of which is incorporated herein in its entirety by reference.

TECHNICAL FIELD

The present disclosure relates to a gateway apparatus, a communication method, and a program, and more specifically, to a gateway apparatus, a communication method, and a program where messages are transmitted.

BACKGROUND ART

In recent years, along with the spread of smartphones and the like, Internet Of Things (IoT) services have become widespread. The IoT services are executed using, for example, terminals and the like that perform autonomous communication without requiring user manipulation. It is generally known that the traffic characteristics of terminals such as smartphones and those of terminals used for the IoT services are different from each other. For example, the amount of data transmitted in the IoT services tends to be smaller than the amount of data transmitted in smartphones and the like. Further, the IoT services may have a traffic characteristic that data is transmitted at a predetermined timing in one day.

As described above, the traffic characteristics of the general services that use the terminals such as smartphones and the like and the traffic characteristics of the IoT services are different from each other. Thus it has been studied how to separate a core network that provides the general services from a core network that provides the IoT services and operate them independently from each other. By separating the core networks, it becomes possible to design facilities in accordance with the traffic characteristics of each of these services.

Patent Literature 1 discloses a configuration of a gateway apparatus having traffic characteristics suitable for differentiating the user terminals having different traffic characteristics and connecting the user terminals. Specifically, a packet allocation controller included in the gateway apparatus determines the destination to which a packet is to be forwarded based on a Media Access Control (MAC) address, domain information or the like of the user terminal included in the packet. Further, the packet allocation controller changes an Internet Protocol (IP) address of the destination of the packet to an IP address of the gateway apparatus to which the packet is to be forwarded.

CITATION LIST

Patent Literature

[Patent Literature 1] Japanese Unexamined Patent Application Publication No. 2015-43522

SUMMARY OF INVENTION

Technical Problem

In the network constructed based on standards such as 3rd Generation Partnership Project (3GPP), however, various types of protocols are defined between the node apparatuses. Therefore, there is a problem that, a simple change in the IP address of the destination when a packet is forwarded is not enough to make information on the protocols defined between the node apparatuses consistent with each other, and the packet cannot be appropriately forwarded.

An object of the present disclosure is to provide a gateway apparatus, a communication method, and a program capable of appropriately allocating a packet in a network constructed based on the 3GPP standards.

Solution to Problem

A gateway apparatus according to a first aspect of the present disclosure is a gateway apparatus arranged between a node apparatus configured to execute communication in accordance with a General Packet Radio Service (GPRS) Tunneling Protocol (GTP) and a Serving-Gateway (S-GW) or between a node apparatus configured to execute communication in accordance with the GTP and a Packet Data Network (PDN)-Gateway (P-GW), the apparatus including: a communication unit configured to terminate a GTP message transmitted from the node apparatus; a determination unit configured to determine a terminal type of a mobile station associated with the GTP message; and a conversion unit configured to change a transmission source address set in the GTP message transmitted from the node apparatus from an identifier of the node apparatus to a first identifier of the gateway apparatus, in which the communication unit transmits, to the S-GW or the P-GW determined in accordance with the terminal type, the GTP message in which the transmission source address has been converted.

A communication method according to a second aspect of the present disclosure is a communication method in a gateway apparatus arranged between a node apparatus configured to execute communication in accordance with a General Packet Radio Service (GPRS) Tunneling Protocol (GTP) and a Serving-Gateway (S-GW) or between a node apparatus configured to execute communication in accordance with the GTP and a Packet Data Network (PDN)-Gateway (P-GW), the method including: terminating a GTP message transmitted from the node apparatus; determining a terminal type of a mobile station associated with the GTP message; changing a transmission source address set in the GTP message transmitted from the node apparatus from an identifier of the node apparatus to a first identifier of the gateway apparatus; and transmitting, to the S-GW or the P-GW determined in accordance with the terminal type, the GTP message in which the transmission source address has been converted.

A program according to a third aspect of the present disclosure is a program for causing a computer, which is a gateway apparatus arranged between a node apparatus configured to execute communication in accordance with a General Packet Radio Service (GPRS) Tunneling Protocol (GTP) and a Serving-Gateway (S-GW) or between a node apparatus configured to execute communication in accordance with the GTP and a Packet Data Network (PDN)-Gateway (P-GW), the program causing the computer to execute the following processing of: terminating a GTP message transmitted from the node apparatus; determining a terminal type of a mobile station associated with the GTP message; changing a transmission source address set in the GTP message transmitted from the node apparatus from an identifier of the node apparatus to a first identifier of the gateway apparatus; and transmitting, to the S-GW or the P-GW determined in accordance with the terminal type, the GTP message in which the transmission source address has been converted.

Advantageous Effects of Invention

According to the present disclosure, it is possible to provide a gateway apparatus, a communication method, and a program capable of appropriately allocating a packet in a network constructed based on the 3GPP standards.

DESCRIPTION OF EMBODIMENTS

First Example Embodiment

Figure 1:
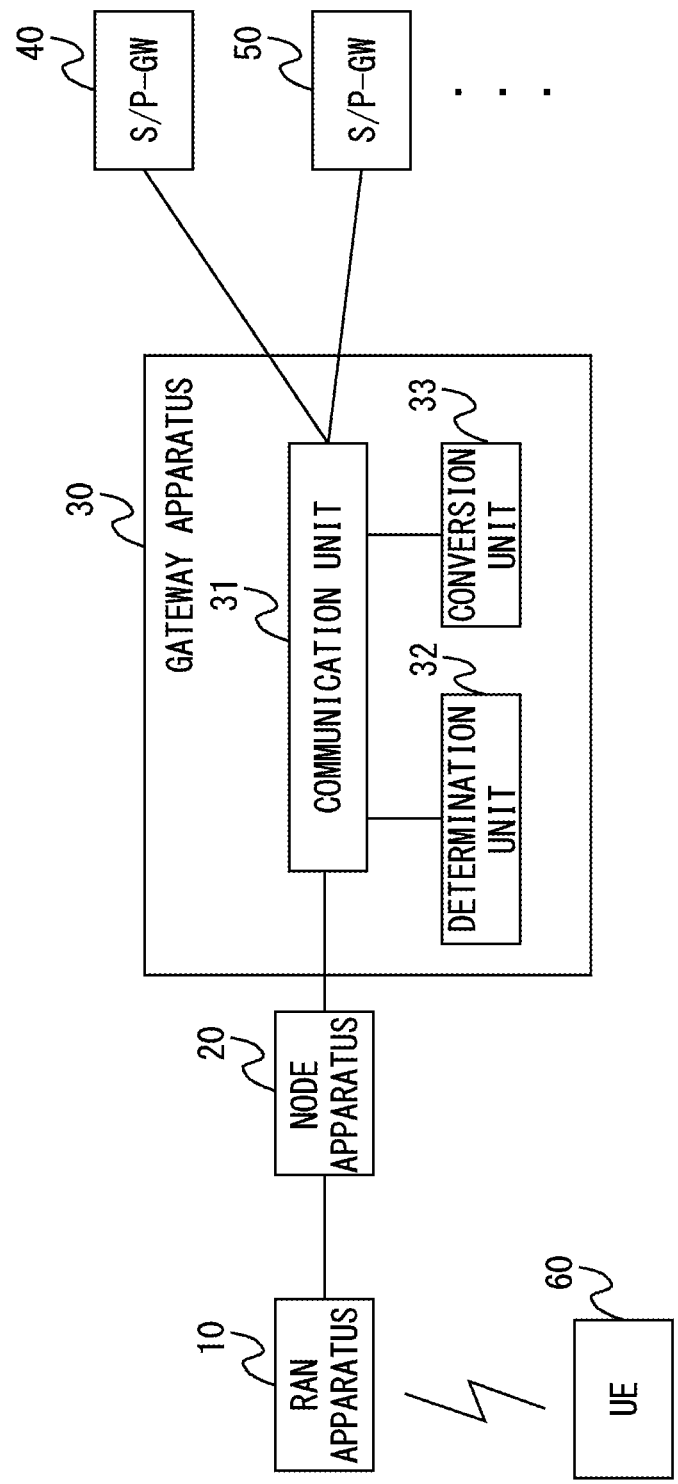
FIG. 1 is a configuration example of a communication system according to a first example embodiment.

Hereinafter, with reference to the drawings, example embodiments of the present disclosure will be explained. With reference to FIG. 1, a configuration example of a communication system according to a first example embodiment of the present disclosure will be explained. The communication system shown in FIG. 1 includes a Radio Access Network (RAN) apparatus 10, a node apparatus 20, a gateway apparatus 30, a Serving (S)/Packet Data Network (PDN) (P)-Gateway (GW) 40, an S/P-GW 50, and a UE 60. The S/P-GW indicates the S-GW or the P-GW. Alternatively, the S/P-GW may indicate the S-GW and the P-GW. Each of the RAN apparatus 10, the node apparatus 20, the gateway apparatus 30, the S/P-GW 40, the S/P-GW 50, and the UE 60 may be a computer apparatus operated by a processor executing a program stored in a memory.

The RAN apparatus 10 may be a base station or a base station control apparatus that controls the base station. Alternatively, the RAN apparatus 10 may include a base station and a base station control apparatus. The base station may be, for example, an eNB, which is a base station that supports Long Term Evolution (LTE) in the 3GPP or a NodeB that supports a radio communication system such as so-called 2G or 3G. The base station control apparatus may be, for example, a Radio Network Controller (RNC) defined in the 3GPP. The RAN apparatus 10 performs radio communication with the UE 60. The UE 60 is a general term for the mobile station used in the 3GPP.

The node apparatus 20 is an apparatus for managing positional information of the UE 60 in the 3GPP and executing call processing control regarding the UE 60. The node apparatus 20 may be, for example, Mobility Management Entity (MME) or Serving General Packet Radio Service (GPRS) Support Node (SGSN) defined in the 3GPP. Alternatively, the node apparatus 20 may be an S-GW that transmits user data regarding the UE 60.

The S/P-GW 40 and the S/P-GW 50 transmit the user data regarding the UE 60.

The gateway apparatus 30 is arranged between the node apparatus 20 and the S/P-GW 40 and further between the node apparatus 20 and the S/P-GW 50. The gateway apparatus 30 relays control data transmitted between the node apparatus 20 and the S/P-GW 40 or the S/P-GW 50. The control data may be data for executing call processing control of the S/P-GW 40. Alternatively, the control data may be data used to set a transmission path of the user data regarding the UE 60. The control data may be referred to as a control signal, control information, C-Plane data or the like. Further, text data, image data, video data or the like transmitted or received by the UE 60 is denoted by user data. The user data may be referred to as user information, U-Plane data or the like.

The node apparatus 20 communicates with the S/P-GW 40 and the S/P-GW 50 in accordance with General Packet Radio Service (GPRS) Tunneling Protocol (GTP). That is, the node apparatus 20 sets various kinds of information in a GTP message, which is a control message defined in the GTP, and transmits the GTP message between the S/P-GW 40 and the S/P-GW 50. The GTP message used as the control message may be referred to as, for example, a GTP-C message.

Next, a configuration example of the gateway apparatus 30 will be explained. The gateway apparatus 30 includes a communication unit 31, a determination unit 32, and a conversion unit 33. The communication unit 31, the determination unit 32, and the conversion unit 33 may be software or module whose processing is executed by a processor executing a program stored in the memory. Further, the communication unit 31, the determination unit 32, and the conversion unit 33 may be hardware such as a circuit or a chip.

The communication unit 31 terminates the GTP message transmitted from the node apparatus 20, the S/P-GW 40, or the S/P-GW 50. That the communication unit 31 terminates the GTP message may indicate that the communication unit 31 analyzes information set in the GTP message or changes, for example, the information set in the GTP message. The communication unit 31 outputs the GTP message that has been received to the determination unit 32 and the conversion unit 33.

The determination unit 32 determines the terminal type of the UE 60 associated with the GTP message. The GTP message is a message used to perform call processing control of the UE 60. That is, the GTP message is transmitted for each UE.

The terminal type may be, for example, identification information of the service executed by the UE 60, information that defines the traffic characteristics of the UE 60, identification information for identifying the other UE 60 or the like. The terminal type may be, for example, information differentiating the terminal that executes the IoT services from the other terminals.

The conversion unit 33 changes a transmission source address set in the GTP message transmitted from the node apparatus 20 from the node apparatus 20 to an identifier A of the gate apparatus 30. The identifier A is an identifier that is used for the communication between the gateway apparatus 30 and the S/P-GW 40 or between the gateway apparatus 30 and the S/P-GW 50.

The communication unit 31 transmits, to the S/P-GW 40 or the S/P-GW 50 determined in accordance with the terminal type, the GTP message in which the transmission source address has been converted. The S/P-GW 40 and the S/P-GW 50 transmit, for example, user data regarding the UE 60 of a specific terminal type. In this case, the communication unit 31 transmits the GTP message to the S/P-GW associated with the terminal that has been determined. In other words, the communication unit 31 distributes the GTP message to the plurality of S/P-GWs in accordance with the terminal type.

As described above, the gateway apparatus 30 shown in FIG. 1 is able to terminate the GTP message used for the communication between the node apparatus 20 and the S/P-GW 40 and further the communication between the node apparatus 20 and the S/P-GW 50 in the 3GPP. Further, the gateway apparatus 30 is able to distribute the GTP message to the plurality of S/P-GWs in accordance with the terminal type of the UE 60.

Further, the gateway apparatus 30 is able to change the transmission source address of the GTP message transmitted from the node apparatus 20 from the node apparatus 20 to the gateway apparatus 30. In this way, the gateway apparatus 30 changes identification information of the transmission source defined in the GTP message and transmits, to the S/P-GW, the GTP message in which the identification information of the transmission source has been changed. As a result, even when the gateway apparatus 30 is arranged between the node apparatus 20 and the S/P-GW 40 and further between the node apparatus 20 and the S/P-GW 50 and has terminated the GTP message, the GTP message can be normally transmitted. That is, the S/P-GW 40 and the S/P-GW 50 set the identification information of the gateway apparatus 30 as the destination of the GTP message, whereby the GTP message transmitted between the node apparatus 20 and the S/P-GW 40 and further between the node apparatus 20 and the S/P-GW 50 can be transmitted via the gateway apparatus 30.

Second Example Embodiment

Figure 2:
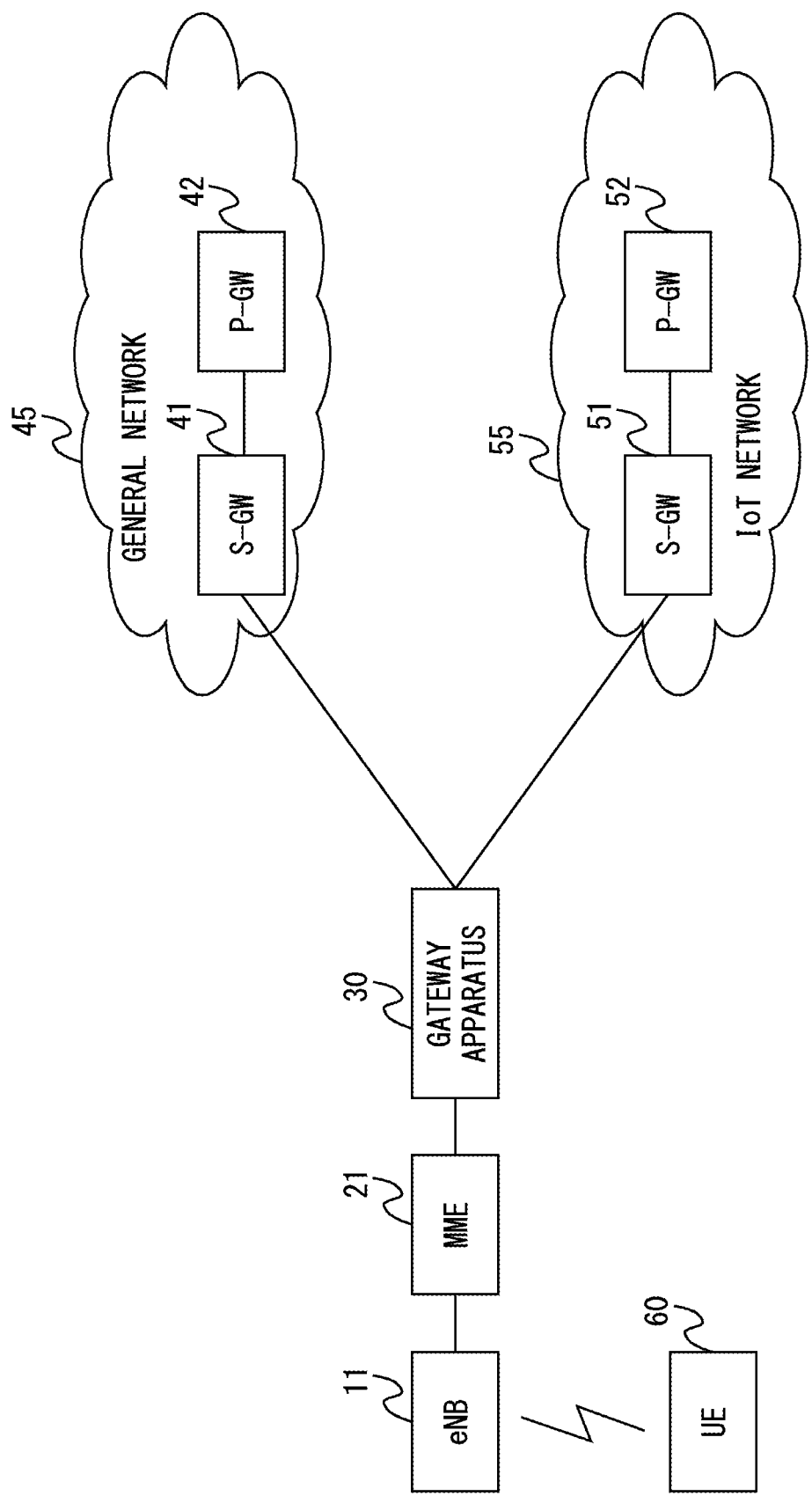
FIG. 2 is a configuration example of a communication system according to a second example embodiment.

Referring next to FIG. 2, a configuration example of a communication system according to a second example embodiment of the present disclosure will be explained. The communication system shown in FIG. 2 includes an eNB 11, an MME 21, a gateway apparatus 30, a general network 45, an IoT network 55, and a UE 60. Further, the general network 45 includes an S-GW 41 and a P-GW 42. The IoT network 55 includes an S-GW 51 and a P-GW 52.

The eNB 11 corresponds to the RAN apparatus 10 shown in FIG. 1. The MME 21 corresponds to the node apparatus 20 shown in FIG. 1. The S-GW 41 corresponds to the S/P-GW 40 shown in FIG. 1. The S-GW 51 corresponds to the S/P-GW 50 shown in FIG. 1. The gateway apparatus 30 and the UE 60 are similar to those shown in FIG. 1.

The IoT network 55 is a network that transmits data regarding the UE used for the IoT services. The IoT network 55 may be, for example, a network that transmits control data and user data regarding the UE used for the IoT services.

The general network 45 is a network that transmits data regarding UE other than the UE used for the IoT services. The UE other than the UE used for the IoT services may be, for example, a mobile telephone, a smartphone or the like that requires user manipulation when the user uses the service.

The amount of data transmitted in the IoT services tends to be smaller than the amount of data transmitted in smartphones and the like. Further, the IoT services may have a traffic characteristic that data is transmitted at a predetermined timing in one day.

On the other hand, it is possible that terminals such as smartphones may receive a large volume of video data. Further, various kinds of services may be used using smartphone terminals, and it is considered that, in recent years, the amount of data transmitted or received by smartphone terminals has been increasing. In this way, the traffic characteristics of the terminals used for the IoT services and those of the terminals used for the other services are different from each other. The traffic related to terminals having the same traffic characteristics are handled in one network, whereby the network can be efficiently designed.

In the IoT network 55, which is the network that handles traffic related to terminals where a small amount of user data is transmitted, the number of node apparatuses such as the S-GW that relay the user data may be reduced.

On the other hand, the general network 45 handles the traffic related to terminals where a large amount of user data is transmitted. Therefore, in the general network 45, the number of node apparatuses such as the S-GW that relay the user data may be increased.

The gateway apparatus 30 determines whether the UE 60 is the terminal that is used for the IoT services, and distributes the message regarding the UE 60 to the S-GW 41 or the S-GW 51.

Figure 3:
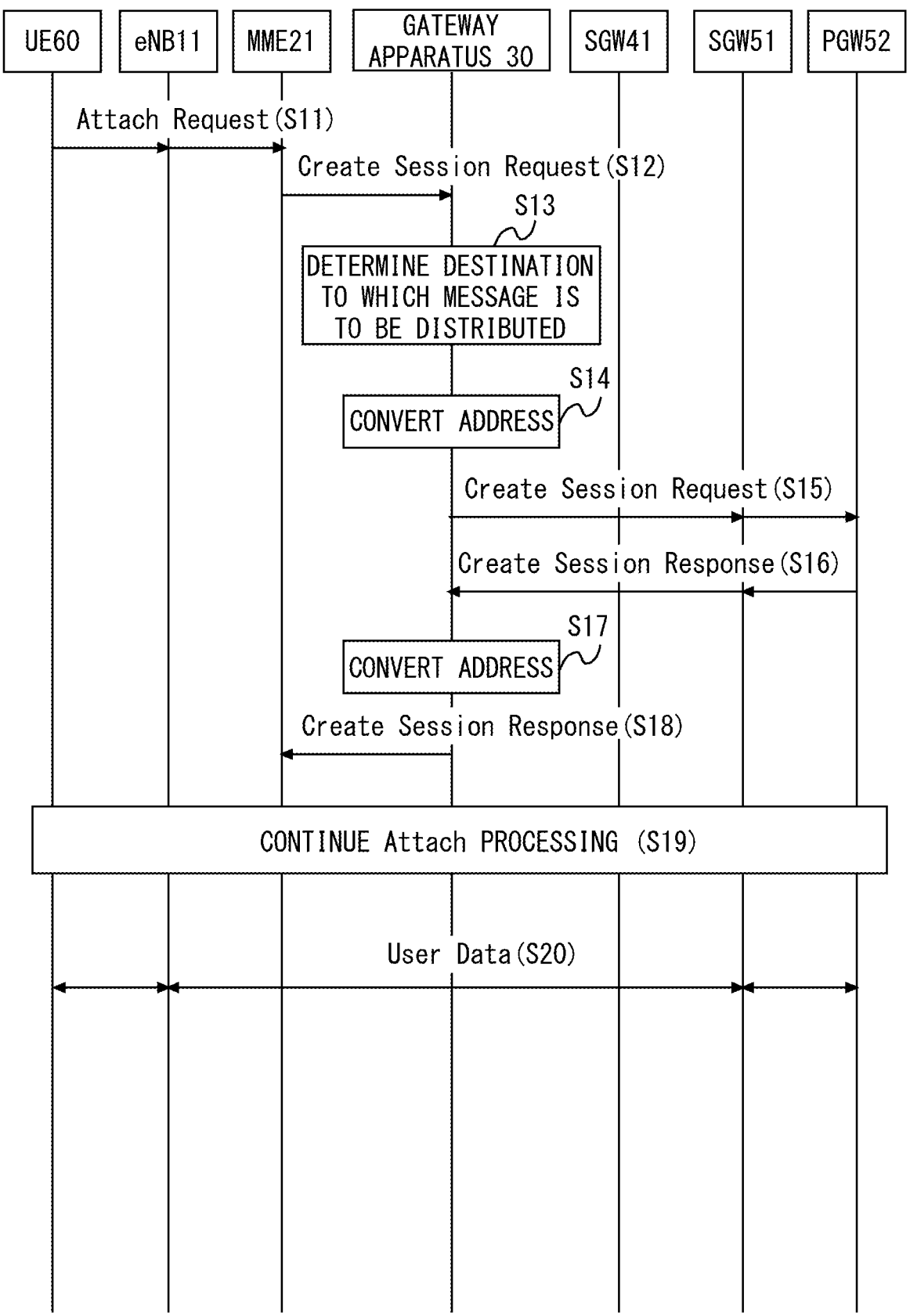
FIG. 3 is a diagram showing a flow of Attach processing according to the second example embodiment.

Referring next to FIG. 3, a flow of Attach processing regarding the UE 60 will be explained. First, the UE 60 transmits an Attach Request message, which is a Non Access Stratum (NAS) message, to the MME 21 via the eNB 11 (S11). The UE 60 may set information regarding the terminal type in the Attach Request message. The information regarding the terminal type may be, for example, information indicating whether this terminal is used for the IoT services. Specifically, the UE 60 may set information regarding the terminal type in Device-Properties, which are parameters to be set in the NAS message.

Next, the MME 21 transmits a Create Session Request message, which is the GTP message, to the gateway apparatus 30 (S12). The destination of the Create Session Request message may be the gateway apparatus 30 or a desired S-GW. The MME 21 may set the terminal type set in the Attach Request message in Signaling Priority Indication, which is a parameter in the GTP message.

The destination of the Create Session Request message is determined in the gateway apparatus 30. Therefore, when a desired S-GW has been set as the destination of the Create Session Request message, the destination of the Create Session Request message is changed in the gateway apparatus 30. Even when a desired S-GW has been set as the destination of the Create Session Request message, a communication path of the Create Session Request message is set in such a way that this message is transmitted to the gateway apparatus 30.

Next, the gateway apparatus 30 determines the destination to which the Create Session Request message, which is the GTP message, is to be distributed (S13). In other words, the gateway apparatus 30 determines the destination of the Create Session Request message. The gateway apparatus 30 determines the destination to which the Create Session Request message is to be distributed using the information regarding the terminal type set in the Create Session Request message. When information indicating that this terminal is the one used for the IoT services is set as the terminal type, the gateway apparatus 30 determines that the destination to which the Create Session Request message is to be distributed is the S-GW 51. In FIG. 3, a case in which the gateway apparatus 30 has determined that the destination to which the Create Session Request message is to be distributed is the S-GW 51 is illustrated.

Next, the gateway apparatus 30 changes or replaces the address of the transmission source of the Create Session Request message from an identifier of the MME 21 to an identifier of the gateway apparatus 30 (S14). A Tunnel Endpoint Identifier (TEID) defined in the GTP is used as the address of the transmission source of the Create Session Request message. The TEID is information for identifying the tunnel set on the path for transmitting the control data between the MME 21 and the S-GW 51. The TEID is information used for identifying the node apparatuses on both ends of the tunnel. In other words, the TEID indicating the transmission source of the Create Session Request message is information used to identify the tunnel which is on the side of the MME 21.

The TEID indicating the MME 21 is denoted by, for example, TEID #A. When, for example, the gateway apparatus 30 has received the Create Session Request message in which TEID #A is set as the information indicating the transmission source, the gateway apparatus 30 changes the information indicating the transmission source to TEID #C. The gateway apparatus 30 manages TEID #A and TEID #C in association with each other. In other words, the gateway apparatus 30 allocates TEID #C to TEID #A.

Next, the gateway apparatus 30 transmits the Create Session Request message in which the TEID indicating the transmission source has been changed to the S-GW 51, and the S-GW 51 transmits the received Create Session Request message to the P-GW 52 (S15).

Next, the P-GW 52 transmits a Create Session Response message, which is the GTP message, to the S-GW 51, and the S-GW 51 transmits the Create Session Response message that has been received to the gateway apparatus 30 (S16). The S-GW 51 sets TEID #C as the destination of the Create Session Response message. Further, the S-GW 51 sets TEID #D as the information indicating the transmission source of the Create Session Response message.

Next, the gateway apparatus 30 changes or replaces the information indicating the transmission source of the Create Session Response message from an identifier of the S-GW 51 to the identifier of the gate apparatus 30. When, for example, the gateway apparatus 30 has received the Create Session Response message in which TEID #D is set as the information indicating the transmission source, the gateway apparatus 30 changes the information indicating the transmission source to TEID #B. The gateway apparatus 30 manages TEID #D and TEID #B in association with each other. In other words, the gateway apparatus 30 allocates TEID #B to TEID #D.

Next, the gateway apparatus 30 transmits, to the MME 21, the Create Session Response message in which information indicating the transmission source has been changed (S18). The gateway apparatus 30 sets TEID #A as the information indicating the destination of the Create Session Response message.

In the following processing, normal Attach processing defined in the 3GPP is continued (S19). Since the normal Attach processing is well-known processing, detailed descriptions thereof will be omitted. Further, in the Attach processing, the gateway apparatus 30 relays control data transmitted between the MME 21 and the S-GW 51. The MME 21 sets TEID #B as the TEID indicating the destination of the control data to be transmitted to the S-GW 51, and the S-GW 51 sets TEID #C as the TEID indicating the destination of the control data to be transmitted to the MME 21. Accordingly, the control data transmitted between the MME 21 and the S-GW 51 is transmitted via the gateway apparatus 30.

Upon completion of the Attach processing, the user data regarding the UE 60 is transmitted via the S-GW 51 and the P-GW 52 (S20).

Figure 4:
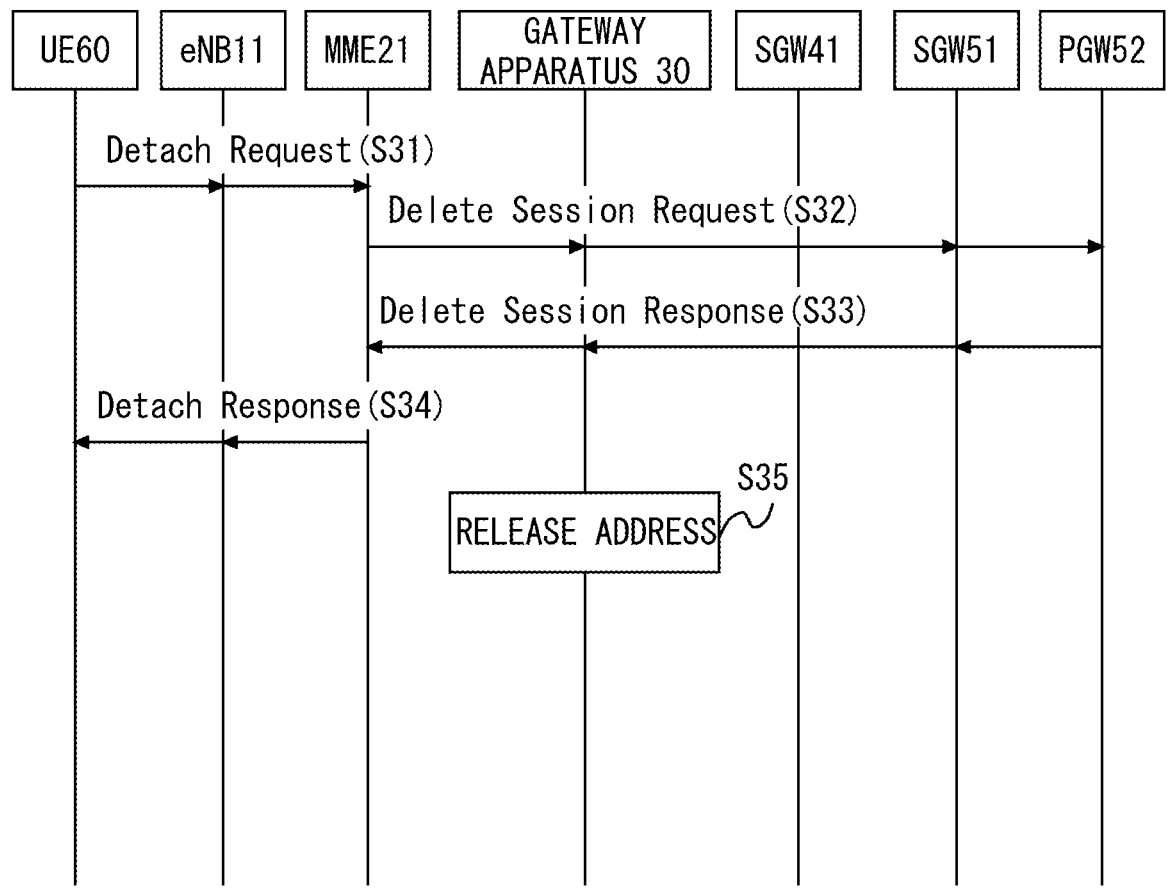
FIG. 4 is a diagram showing a flow of Detach processing according to the second example embodiment.

Referring next to FIG. 4, a flow of Detach processing according to the second example embodiment of the present disclosure will be explained. First, the UE 60 transmits a Detach Request message to the MME 21 via the eNB 11 (S31).

Next, the MME 21 transmits a Delete Session Request message, which is the GTP message, to the S-GW 51 via the gateway apparatus 30 in order to release an Evolved Packet System (EPS) bearer regarding the UE 60. Further, the S-GW 51 transmits the Delete Session Request message that has been received to the P-GW 52 (S32). In Step S32, the gateway apparatus 30 performs address conversion, similar to Step S14 in FIG. 3.

Next, the P-GW 52 transmits a Delete Session Response message, which is the GTP message, to the S-GW 51 in response to the Delete Session Request message (S33). Further, the S-GW 51 transmits the received Delete Session Response message to the MME 21 via the gateway apparatus 30 (S33). In Step S33, the gateway apparatus 30 performs address conversion, similar to Step S17 shown in FIG. 3.

Next, the MME 21 transmits a Detach Response message to the UE 60 via the eNB 11 in response to the Detach Request message received in Step S31 (S34).

Next, the gateway apparatus 30 releases or deletes the management information in which TEID #A and TEID #C are associated with each other and further the management information in which TEID #B and TEID #D are associated with each other in the Attach processing shown in FIG. 3

(S35). In other words, the gateway apparatus 30 releases TEID #C allocated to TEID #A and TEID #B allocated to TEID #D.

As described above, by executing the Attach processing according to the second example embodiment of the present disclosure, the gateway apparatus 30 is able to select the S-GW in accordance with the terminal type of the UE 60 and distribute the GTP message to the selected S-GW. Further, the gateway apparatus 30 is able to terminate the GTP message and forward the GTP message between the MME 21 via the gateway apparatus 30 and the S-GW 41 or the S-GW 51 by converting the address information set in the GTP message. That is, the gateway apparatus 30 is able to relay the GTP message transmitted between the MME and the S-GW by changing the address of the GTP message transmitted between the MME and the S-GW.

While the Attach processing and the Detach processing in the communication system shown in FIG. 2 have been described in the second example embodiment, Attach processing and Detach processing in the communication system different from that shown in FIG. 2 will be explained.

Figure 5:
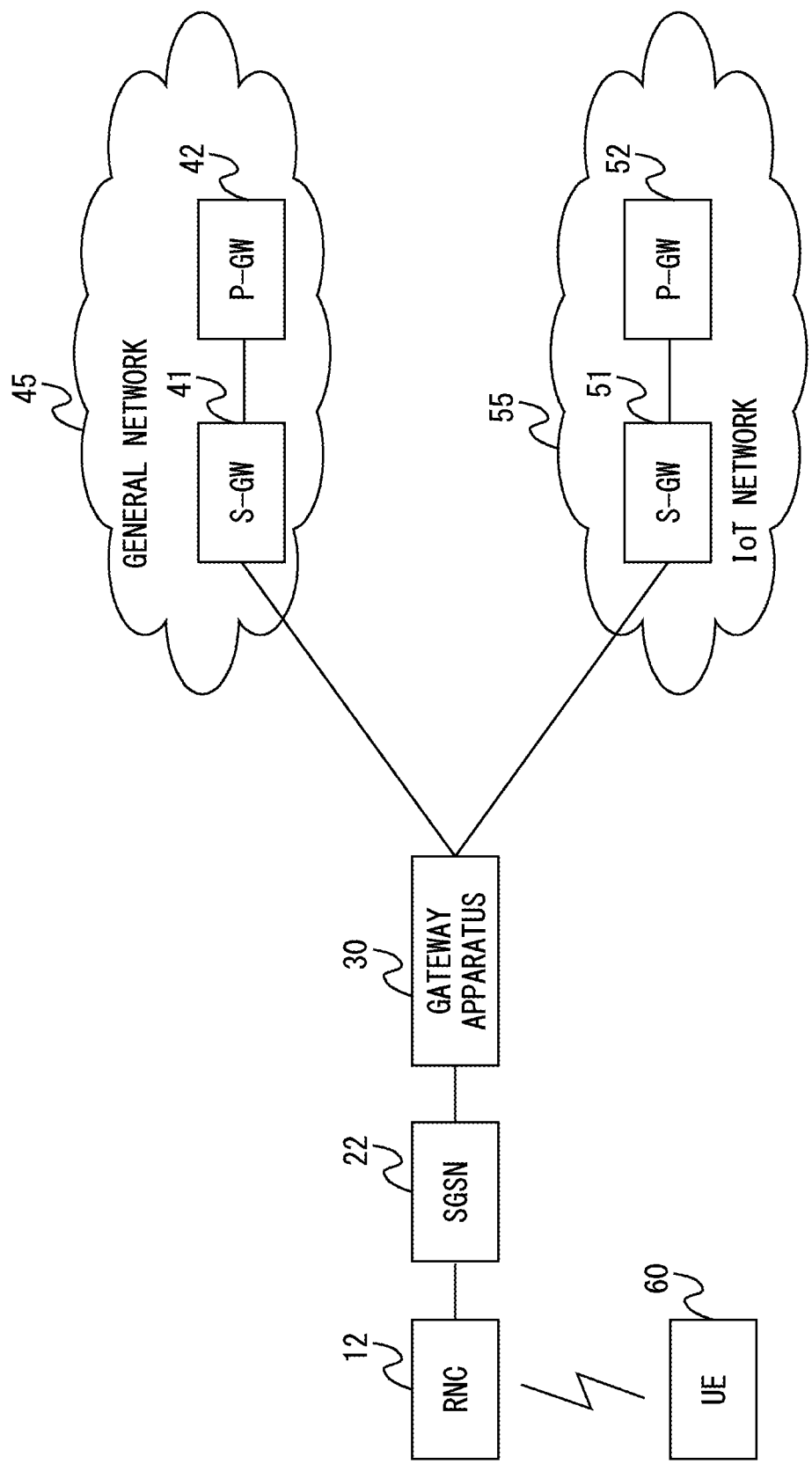
FIG. 5 is a configuration example of the communication system according to the second example embodiment.

For example, the communication system shown in FIG. 5 may be used in place of the communication system shown in FIG. 2. The communication system shown in FIG. 2 shows a configuration in which LTE is used in the radio access network. The communication system shown in FIG. 5 shows a configuration in which a radio access system defined to be 3G in the 3GPP is used in the radio access network.

In the communication system shown in FIG. 5, an RNC 12 is arranged in place of the eNB 11 in the communication system shown in FIG. 2. Further, in the communication system shown in FIG. 5, an SGSN 22 is arranged in place of the MME 21 in the communication system shown in FIG. 2. The configurations other than the RNC 12 and the SGSN 22 in the communication system shown in FIG. 5 are similar to those in the communication system shown in FIG. 2.

In the communication system shown in FIG. 5 as well, the Attach processing described with reference to FIG. 3 and the Detach processing described with reference to FIG. 4 are executed.

Third Example Embodiment

Figure 6:
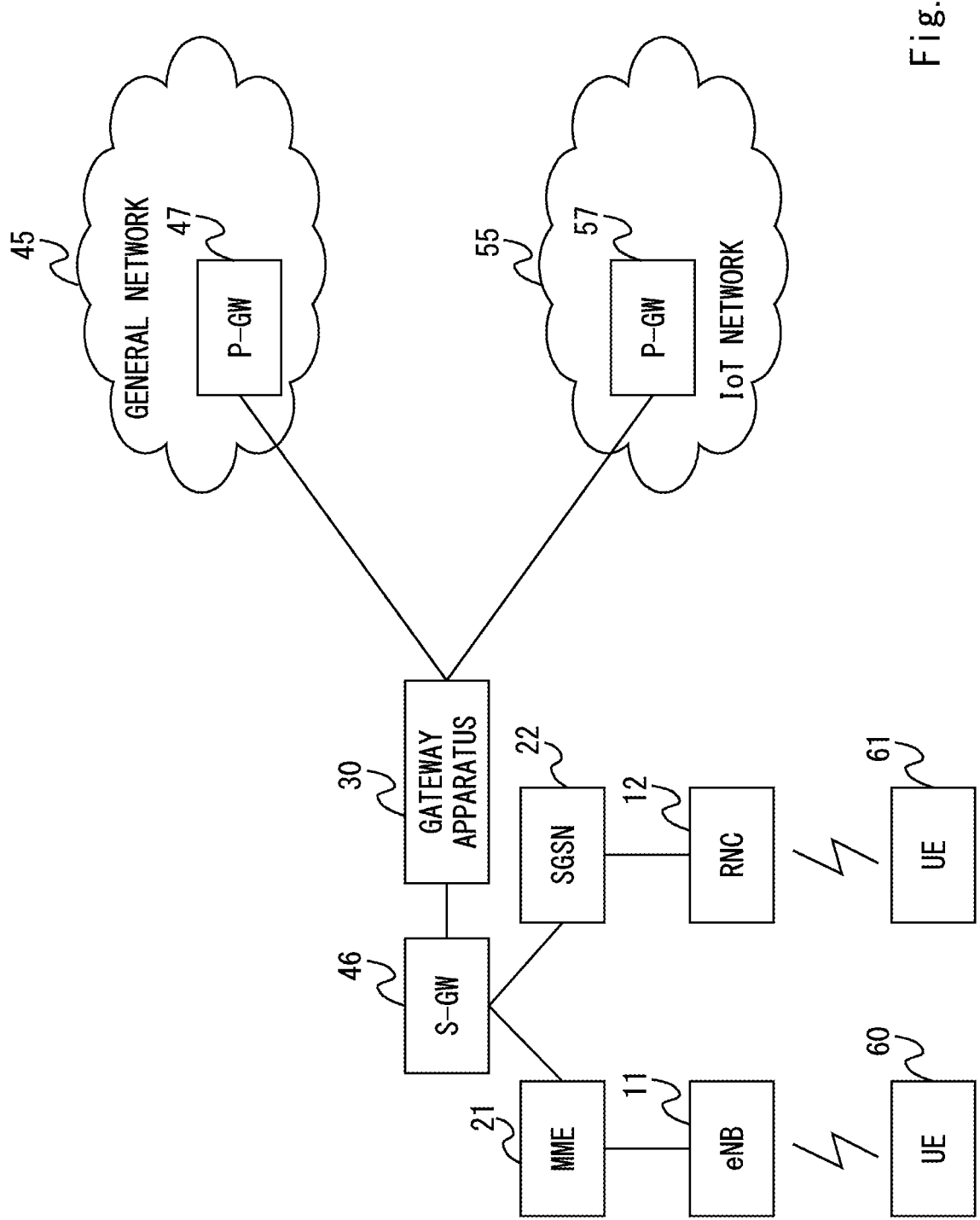
FIG. 6 is a configuration example of a communication system according to a third example embodiment.

Referring next to FIG. 6, a configuration example of a communication system according to a third example embodiment of the present disclosure will be explained. In the communication system shown in FIG. 6, the gateway apparatus 30 is arranged between an S-GW 46 and a P-GW 47 and further between the S-GW 46 and a P-GW 57. While a configuration in which the gateway apparatus 30 selects one of the S-GW 41 and the S-GW 51 is shown in the communication system shown in FIG. 2, the communication system shown in FIG. 6 is different from the communication system shown in FIG. 2 in that the gateway apparatus 30 selects one of the P-GW 47 and the P-GW 57.

Further, the configuration of the communication system shown in FIG. 6 is different from that of the communication system shown in FIG. 5 in which the SGSN 22 is connected to the S-GW via the gateway apparatus 30 in that the SGSN 22 is connected to the S-GW 46 in the communication system shown in FIG. 6.

Figure 7:
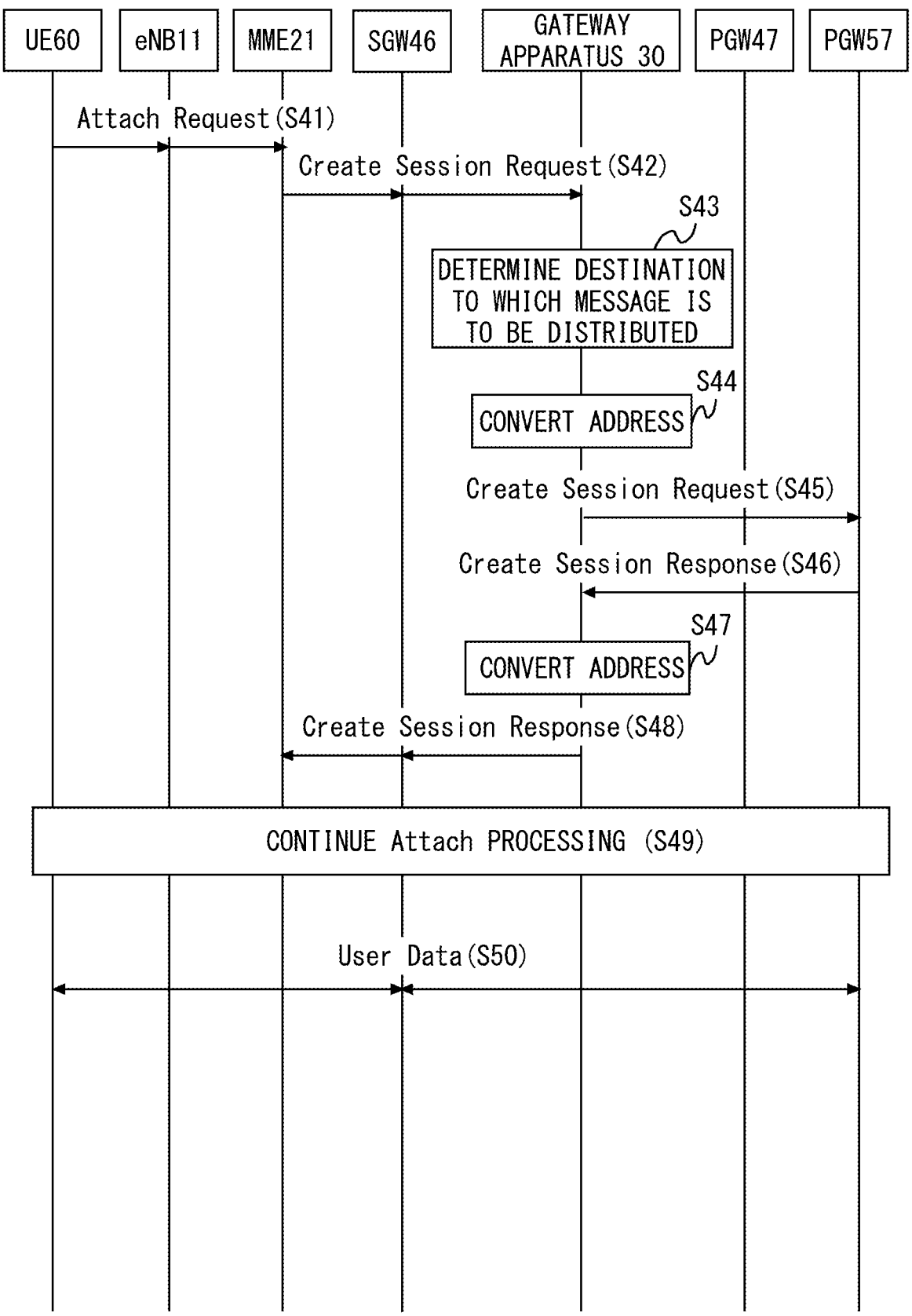
FIG. 7 is a diagram showing a flow of Attach processing according to the third example embodiment.

Referring next to FIG. 7, a flow of Attach processing regarding the UE 60 shown in FIG. 6 will be explained. First, the UE 60 transmits an Attach Request message, which is the Non Access Stratum (NAS) message, to the MME 21 via the eNB 11 (S41). The UE 60 may set information regarding the terminal type in the Attach Request message. The information regarding the terminal type may be, for example, information indicating whether this terminal is used for the IoT services. Specifically, the UE 60 may set the information regarding the terminal type in Device-Properties, which are parameters to be set in the NAS message.

Next, the MME 21 transmits a Create Session Request message, which is the GTP message, to the S-GW 46 (S42). The MME 21 may set the terminal type set in the Attach Request message in Signaling Priority Indication, which is a parameter in the GTP message.

Further, the S-GW 46 transmits the received Create Session Request message to the gateway apparatus 30 (S42). The destination of the Create Session Request message is determined in the gateway apparatus 30. Therefore, when a desired P-GW has been set as the destination of the Create Session Request message, the destination of the Create Session Request message is changed in the gateway apparatus 30. Further, even when a desired P-GW has been set as the destination of the Create Session Request message, a communication path of the Create Session Request message is set in such a way that this message will be transmitted to the gateway apparatus 30.

Next, the gateway apparatus 30 determines the destination to which the Create Session Request message, which is the GTP message, is to be distributed (S43). In other words, the gateway apparatus 30 determines the destination of the Create Session Request message. The gateway apparatus 30 determines the destination to which the Create Session Request message is to be distributed using the information regarding the terminal type set in the Create Session Request message. When information indicating that this terminal is the one used for the IoT services is set as the terminal type, the gateway apparatus 30 determines that the destination to which the Create Session Request message is to be distributed is the P-GW 57. In FIG. 7, a case in which the gateway apparatus 30 has determined that the destination to which the Create Session Request message is to be distributed is the P-GW 57 is illustrated.

Next, the gateway apparatus 30 changes or replaces the address of the transmission source of the Create Session Request message from an identifier of the S-GW 46 to the identifier of the gate apparatus 30 (S44).

The TEID indicating the S-GW 46 is denoted by, for example, TEID #A. When, for example, the gateway apparatus 30 has received the Create Session Request message in which TEID #A is set as the information indicating the transmission source, the gateway apparatus 30 changes the information indicating the transmission source to TEID #C. The gateway apparatus 30 manages TEID #A and TEID #C in association with each other. In other words, the gateway apparatus 30 allocates TEID #C to TEID #A.

Next, the gateway apparatus 30 transmits, to the P-GW 57, the Create Session Request message in which the TEID indicating the transmission source has been changed (S45).

Next, the P-GW 57 transmits a Create Session Response message, which is the GTP message, to the gateway apparatus 30 (S46). The P-GW 57 sets TEID #C as the destination of the Create Session Response message. Further, the P-GW 57 sets TEID #D as the information indicating the transmission source of the Create Session Response message.

Next, the gateway apparatus 30 changes or replaces the information indicating the transmission source of the Create Session Response message from an identifier of the P-GW 57 to the identifier of the gate apparatus 30 (S47). When, for example, the gateway apparatus 30 has received the Create Session Response message in which TEID #D is set as the information indicating the transmission source, the gateway apparatus 30 changes the information indicating the transmission source to TEID #B. The gateway apparatus 30 manages TEID #D and TEID #B in association with each other. In other words, the gateway apparatus 30 allocates TEID #B to TEID #D.

Next, the gateway apparatus 30 transmits, to the S-GW 46, the Create Session Response message in which information indicating the transmission source has been changed (S48). The gateway apparatus 30 sets TEID #A as the information indicating the destination of the Create Session Response message. Further, the S-GW 46 transmits the Create Session Response message that has been received to the MME 21 (S48).

In the following processing, normal Attach processing defined in the 3GPP is continued (S49). Since the normal Attach processing is well-known processing, detailed descriptions thereof will be omitted. Further, in the Attach processing, the gateway apparatus 30 relays control data transmitted between the S-GW 46 and the P-GW 57. The S-GW 46 sets TEID #B as the TEID indicating the destination of the control data to be transmitted to the P-GW 57, and the P-GW 57 sets TEID #C as the TEID indicating the destination of the control data to be transmitted to the S-GW 46. Accordingly, the control data transmitted between the S-GW 46 and the P-GW 57 is transmitted via the gateway apparatus 30.

Upon completion of the Attach processing, the user data regarding the UE 60 is transmitted via the S-GW 46 and the P-GW 57 (S50).

The TEID of the tunnel used to transmit the user data may be set in the Create Session Request message in Steps S42 and S45 and the Create Session Response message in Step S46. For example, the TEID on the side of the S-GW 46 of the tunnel used to transmit the user data may be set between the S-GW and the P-GW in the Create Session Request message in Step S42. The gateway apparatus 30 may or may not convert, in Step S44, the TEID on the side of the S-GW 46 of the tunnel used to transmit the user data. Further, the gateway apparatus 30 may or may not convert, in Step S47, the TEID on the side of the P-GW 57 of the tunnel used to transmit the user data.

When the gateway apparatus 30 has converted the TEID on the side of the S-GW 46 and the TEID on the side of the P-GW 57 of the tunnel used to transmit the user data, the user data transmitted between the S-GW 46 and the P-GW 57 is relayed by the gateway apparatus 30. Further, when the gateway apparatus 30 does not convert the TEID on the side of the S-GW 46 and the TEID on the side of the P-GW 57 of the tunnel used to transmit the user data, the user data transmitted between the S-GW 46 and the P-GW 57 is not relayed by the gateway apparatus 30.

While the flow of the Attach processing regarding the UE 60 has been described in FIG. 7, processing similar to the processing shown in FIG. 7 is executed also for the Attach processing regarding the UE 61. In the Attach processing regarding the UE 61, the eNB 11 shown in FIG. 7 is replaced by the RNC 12 and the MME 21 shown in FIG. 7 is replaced by the SGSN 22.

Figure 8:
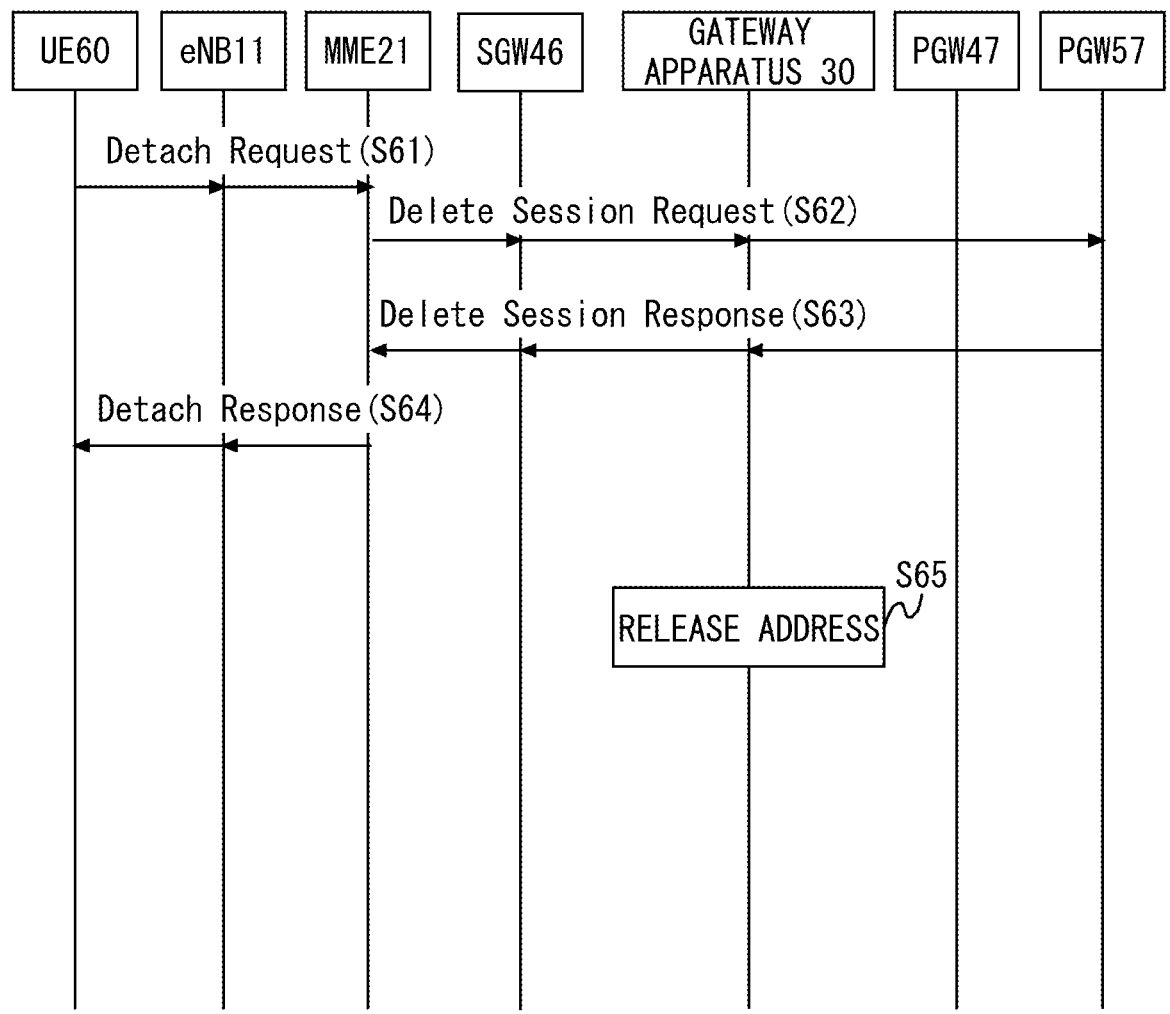
FIG. 8 is a diagram showing a flow of Detach processing according to the third example embodiment.

Referring next to FIG. 8, a flow of Detach processing according to the third example embodiment of the present disclosure will be explained. First, the UE 60 transmits a Detach Request message to the MME 21 via the eNB 11 (S61).

Next, the MME 21 transmits a Delete Session Request message, which is the GTP message, to the S-GW 46 to release the Evolved Packet System (EPS) bearer regarding the UE 60. Further, the S-GW 46 transmits the Delete Session Request message that has been received to the P-GW 57 via the gateway apparatus 30 (S62). In Step S62, the gateway apparatus 30 performs address conversion, similar to Step S44 shown in FIG. 7.

Next, the P-GW 57 transmits a Delete Session Response message, which is the GTP message, to the S-GW 46 via the gateway apparatus 30 in response to the Delete Session Request message (S63). In Step S63, the gateway apparatus 30 performs address conversion, similar to Step S47 shown in FIG. 7.

Next, the MME 21 transmits a Detach Response message to the UE 60 via the eNB 11 in response to the Detach Request message received in Step S31 (S64).

Next, in the Attach processing shown in FIG. 7, the gateway apparatus 30 releases or deletes the management information in which TEID #A and TEID #C are associated with each other and further the management information in which TEID #B and TEID #D are associated with each other (S65). In other words, the gateway apparatus 30 releases TEID #C allocated to TEID #A and TEID #B allocated to TEID #D.

As described above, by executing the Attach processing according to the third example embodiment of the present disclosure, the gateway apparatus 30 is able to select the P-GW in accordance with the terminal type of the UE 60 and to distribute the GTP message to the selected P-GW. Further, the gateway apparatus 30 is able to terminate the GTP message and forward the GTP message between the S-GW 46 via the gateway apparatus 30 and the P-GW 47 or the P-GW 57 by converting the address information set in the GTP message. That is, the gateway apparatus 30 is able to relay the GTP message transmitted between the S-GW and the P-GW by converting the address of the GTP message transmitted between the S-GW and the P-GW.

Fourth Example Embodiment

Figure 9:
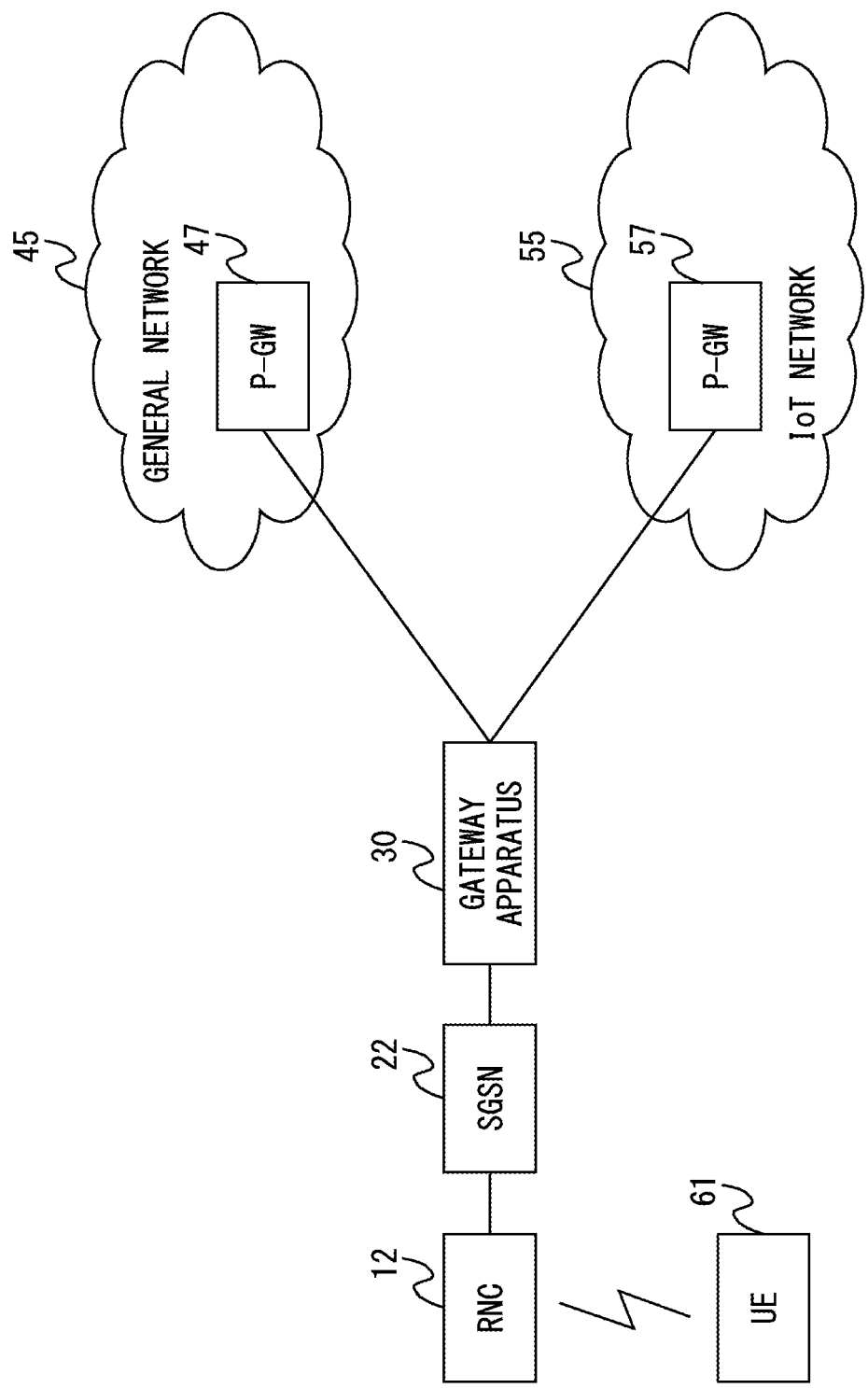
FIG. 9 is a configuration example of a communication system according to a fourth example embodiment.

Referring next to FIG. 9, a configuration example of a communication system according to a fourth example embodiment of the present disclosure will be explained. The communication system shown in FIG. 9 shows that the gateway apparatus 30 is arranged between the SGSN 22 and the P-GW 47 and further between the SGSN 22 and the P-GW 57. The communication system shown in FIG. 9 shows that the gateway apparatus 30 selects one of the P-GW 47 and the P-GW 57. Further, the communication system shown in FIG. 9 shows that the UE 61 communicates with the SGSN 22 via the RNC 12.

Figure 10:
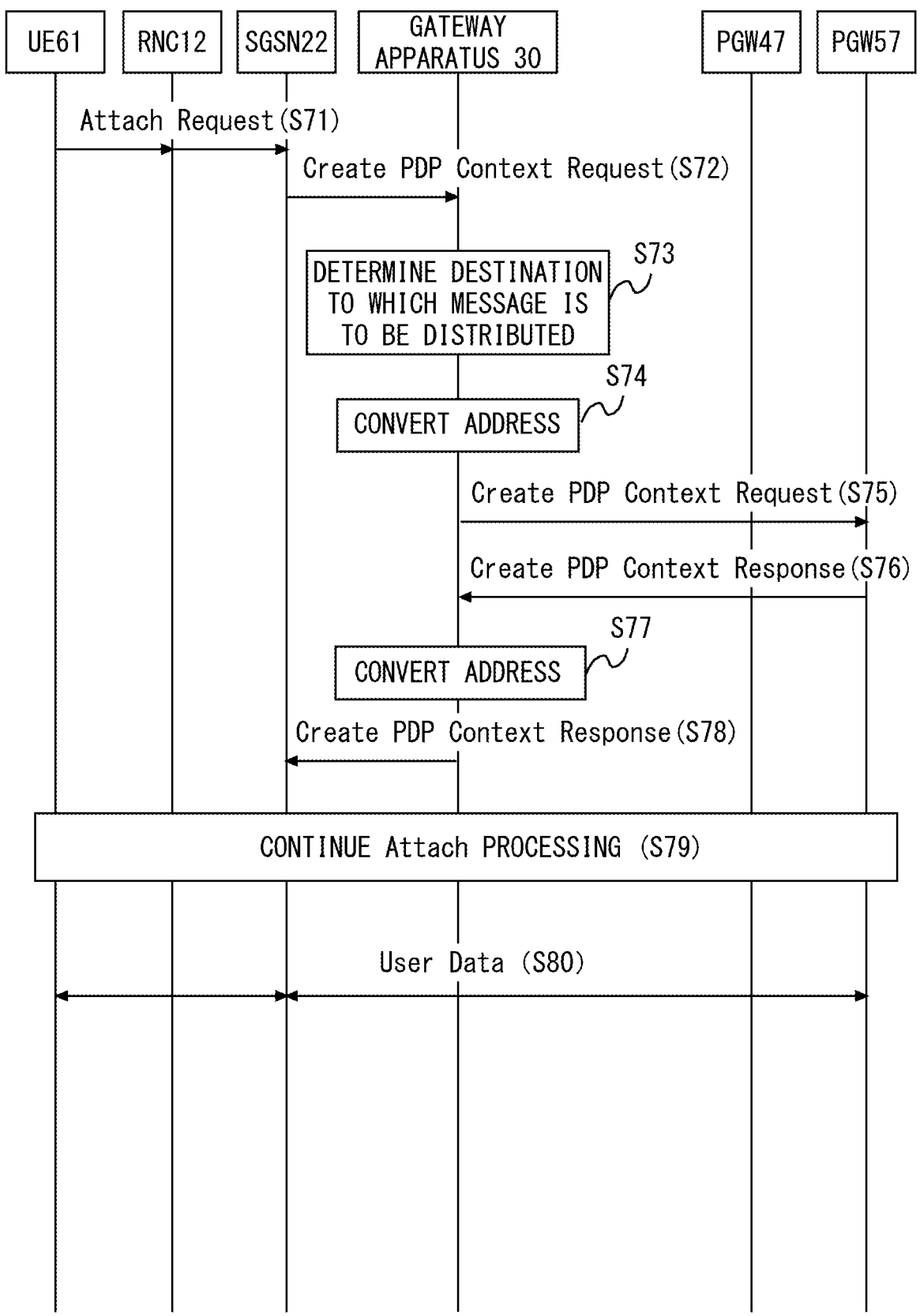
FIG. 10 is a diagram showing a flow of Attach processing according to the fourth example embodiment.

Referring next to FIG. 10, a flow of Attach processing regarding the UE 61 in FIG. 9 will be explained. First, the UE 61 transmits an Attach Request message, which is the Non Access Stratum (NAS) message, to the SGSN 22 via the RNC 12 (S71). The UE 61 may set information regarding the terminal type in the Attach Request message. The information regarding the terminal type may be, for example, information indicating whether this terminal is used for the IoT services. Specifically, the UE 61 may set the information regarding the terminal type in Device-Properties, which are parameters to be set in the NAS message.

Next, the SGSN 22 transmits a Create PDP Context Request message, which is the GTP message, to the gateway apparatus 30 (S72). The SGSN 22 may set the terminal type set in the Attach Request message in Signaling Priority Indication, which is a parameter in the GTP message. The GTP message transmitted between the SGSN and the P-GW without using the S-GW conforms to GTP version 1 (GTPv1). The GTP message transmitted between the MME and the P-GW and further the GTP message transmitted between the SGSN and the P-GW via the S-GW described in other example embodiments conform to GTP version 2 (GTPv2).

The destination of the Create PDP Context Request message is determined in the gateway apparatus 30. Therefore, when a desired P-GW has been set as the destination of the Create PDP Context Request message, the destination of the Create PDP Context Request message is changed in the gateway apparatus 30. Further, even when a desired P-GW has been set as the destination of the Create PDP Context Request message, the communication path of the Create PDP Context Request message is set in such a way that this message is transmitted to the gateway apparatus 30.

Next, the gateway apparatus 30 determines the destination to which the Create PDP Context Request message, which is the GTP message, is to be distributed (S73). In other words, the gateway apparatus 30 determines the destination of the Create PDP Context Request message. The gateway apparatus 30 determines the destination to which the Create PDP Context Request message is to be distributed using the information regarding the terminal type set in the Create PDP Context Request message. When information indicating that this terminal is the one used for the IoT services is set as the terminal type, the gateway apparatus 30 determines that the destination to which the Create PDP Context Request message is to be distributed is the P-GW 57. In FIG. 10, the case in which the gateway apparatus 30 has determined that the destination to which the Create PDP Context Request message is to be distributed is the P-GW 57 is illustrated.

Next, the gateway apparatus 30 changes or replaces the address of the transmission source of the Create PDP Context Request message from an identifier of the SGSN 22 to the identifier of the gate apparatus 30 (S74).

The TEID indicating the SGSN 22 is denoted by, for example, TEID #A. When, for example, the gateway apparatus 30 has received the Create PDP Context Request message in which TEID #A is set as the information indicating the transmission source, the gateway apparatus 30 changes the information indicating the transmission source to TEID #C. The gateway apparatus 30 manages TEID #A and TEID #C in association with each other. In other words, the gateway apparatus 30 allocates TEID #C to TEID #A.

Next, the gateway apparatus 30 transmits, to the P-GW 57, the Create PDP Context Request message in which the TEID indicating the transmission source has been changed (S75).

Next, the P-GW 57 transmits a Create PDP Context Response message, which is the GTP message, to the gateway apparatus 30 (S76). The P-GW 57 sets TEID #C as the destination of the Create PDP Context Response message. Further, the P-GW 57 sets TEID #D as the information indicating the transmission source of the Create PDP Context Response message.

Next, the gateway apparatus 30 changes or replaces the information indicating the transmission source of the Create PDP Context Response message from the identifier of the P-GW 57 to the identifier of the gate apparatus 30 (S77). When, for example, the gateway apparatus 30 has received the Create PDP Context Response message in which TEID #D is set as the information indicating the transmission source, the gateway apparatus 30 changes the information indicating the transmission source to TEID #B. The gateway apparatus 30 manages TEID #D and TEID #B in association with each other. In other words, the gateway apparatus 30 allocates TEID #B to TEID #D.

Next, the gateway apparatus 30 transmits, to the SGSN 22, the Create PDP Context Response message in which the information indicating the transmission source has been changed (S78). The gateway apparatus 30 sets TEID #A as information indicating the destination of the Create PDP Context Response message.

In the following processing, normal Attach processing defined in the 3GPP is continued (S79). Since the normal Attach processing is well-known processing, detailed descriptions thereof will be omitted. Further, in the Attach processing, the gateway apparatus 30 relays control data transmitted between the SGSN 22 and the P-GW 57. The SGSN 22 sets TEID #B as the TEID indicating the destination of the control data to be transmitted to the P-GW 57 and the P-GW 57 sets TEID #C as the TEID indicating the destination of the control data to be transmitted to the SGSN 22. Accordingly, the control data transmitted between the SGSN 22 and the P-GW 57 is transmitted via the gateway apparatus 30.

When the Attach processing is completed, the user data regarding the UE 60 is transmitted via the SGSN 22 and the P-GW 57 (S80).

Figure 11:
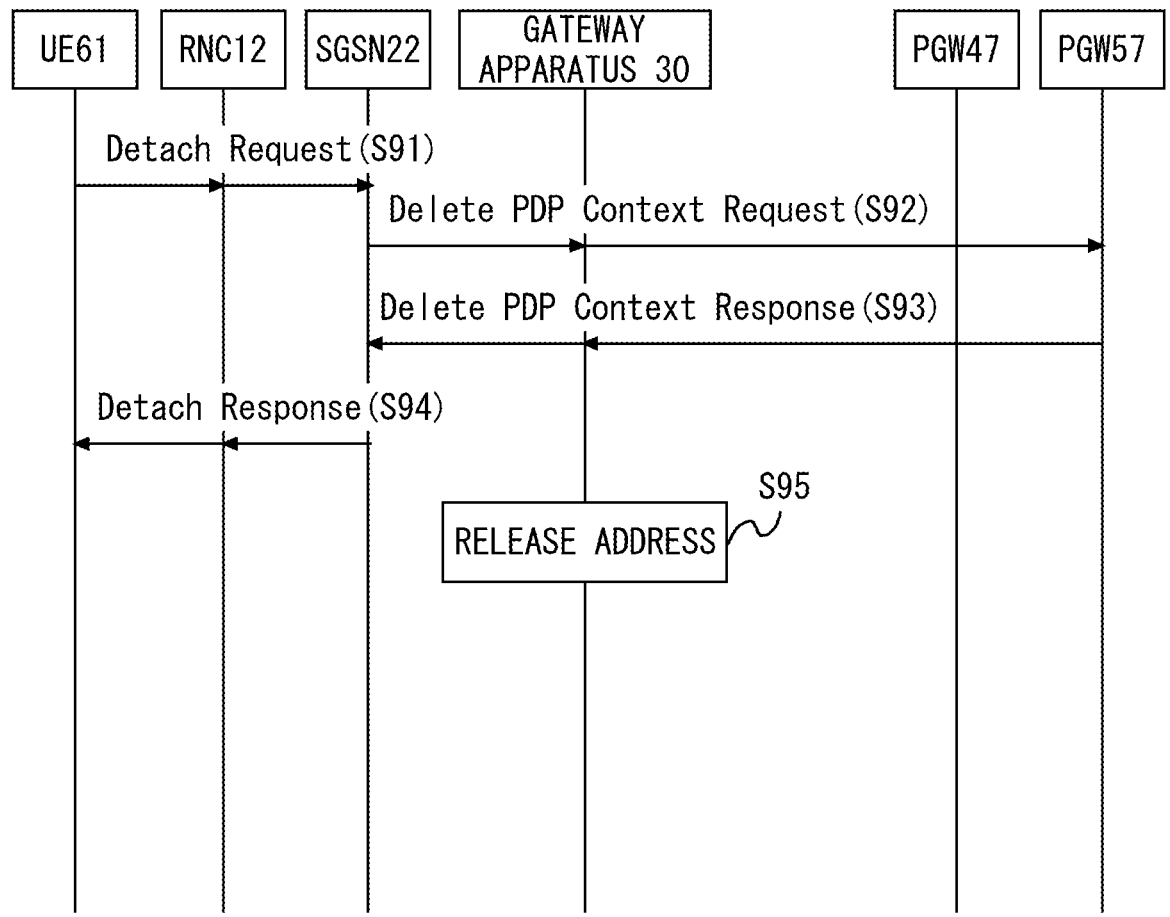
FIG. 11 is a diagram showing a flow of Detach processing according to the fourth example embodiment.

Referring next to FIG. 11, a flow of Detach processing according to the fourth example embodiment of the present disclosure will be explained. First, the UE 61 transmits a Detach Request message to the SGSN 22 via the RNC 12 (S91).

Next, the SGSN 22 transmits a Delete PDP Context Request message, which is the GTP message, to the P-GW 57 via the gateway apparatus 30 in order to release the Evolved Packet System (EPS) bearer regarding the UE 61 (S92). In Step S92, the gateway apparatus 30 performs address conversion, similar to Step S74 shown in FIG. 10.

Next, the P-GW 57 transmits a Delete PDP Context Response message, which is the GTP message, to the SGSN 22 via the gateway apparatus 30 in response to the Delete PDP Context Request message (S93). In Step S93, the gateway apparatus 30 performs address conversion, similar to Step S77 shown in FIG. 10.

Next, the SGSN 22 transmits a Detach Response message to the UE 61 via the RNC 12 in response to the Detach Request message received in Step S91 (S94).

Next, the gateway apparatus 30 releases or deletes the management information in which TEID #A and TEID #C are associated with each other and further the management information in which TEID #B and TEID #D are associated with each other in the Attach processing shown in FIG. 10 (S95). In other words, the gateway apparatus 30 releases TEID #C allocated to TEID #A and TEID #B allocated to TEID #D.

As described above, by executing the Attach processing according to the fourth example embodiment of the present disclosure, the gateway apparatus 30 is able to select the P-GW in accordance with the terminal type of the UE 61 and to distribute the GTP message to the selected P-GW. Further, the gateway apparatus 30 is able to terminate the GTP message and forward the GTP message between the SGSN 22 via the gateway apparatus 30 and the P-GW 47 or the P-GW 57 by converting the address information set in the GTP message. That is, the gateway apparatus 30 is able to relay the GTP message transmitted between the SGSN and the P-GW by converting the address of the GTP message transmitted between the SGSN and the P-GW.

Fifth Example Embodiment

Figure 12:
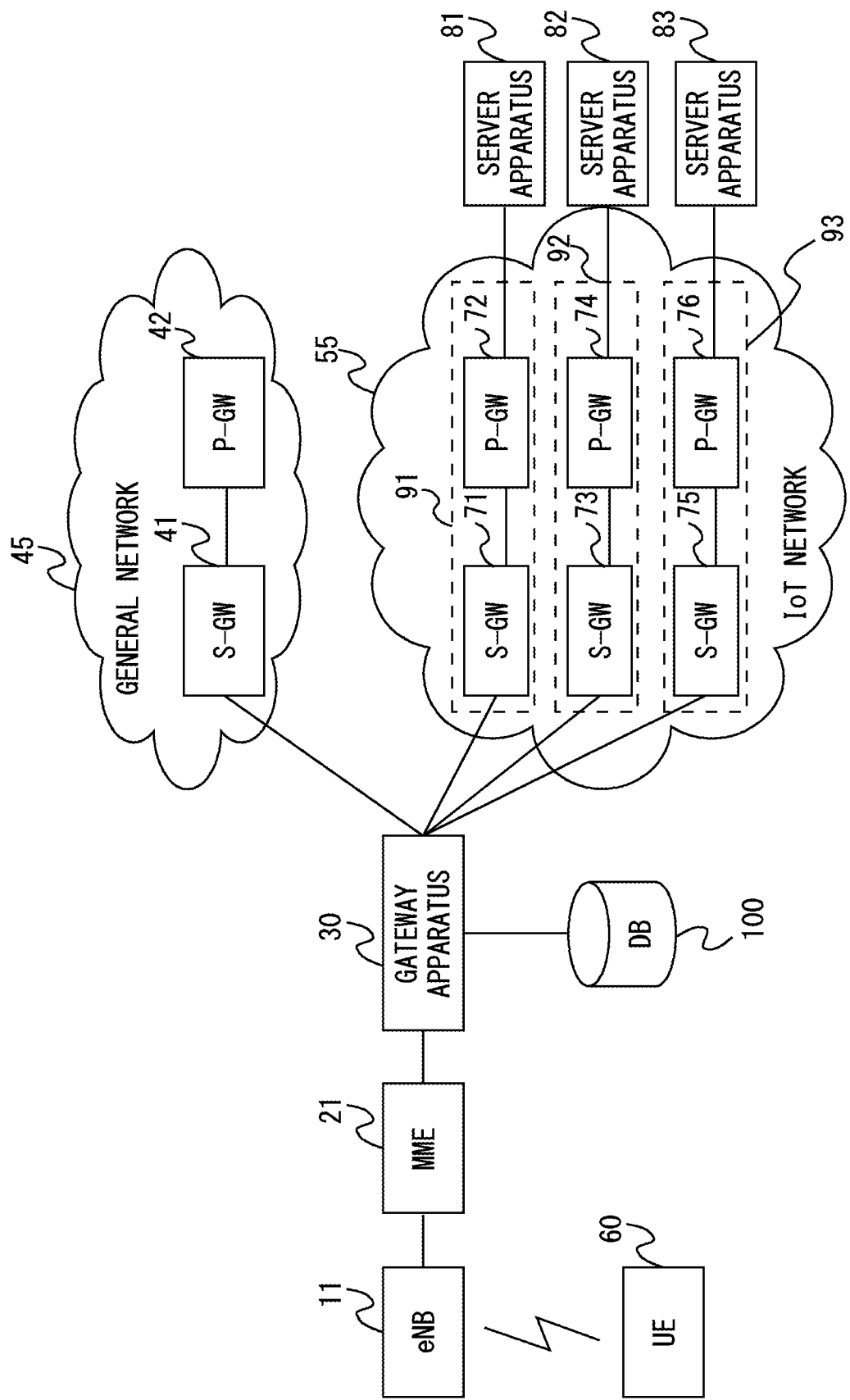
FIG. 12 is a configuration example of a communication system according to a fifth example embodiment.

Referring next to FIG. 12, a configuration example of a communication system according to a fifth example embodiment of the present disclosure will be explained. In the communication system shown in FIG. 12, a database (DB) 100 is added to the communication system shown in FIG. 2. Further, an IoT core network 91, an IoT core network 92, and an IoT core network 93 are present in the IoT network 55, an S-GW 71 and a P-GW 72 are arranged in the IoT core network 91, an S-GW 73 and a P-GW 74 are arranged in the IoT core network 92, and an S-GW 75 and a P-GW 76 are arranged in the IoT core network 93. Further, a server apparatus 81 is connected to the P-GW 72, a server apparatus 82 is connected to the P-GW 74, and a server apparatus 83 is connected to the P-GW 76.

In the IoT network 55, IoT core networks are divided like the IoT core network 91, the IoT core network 92, the IoT core network 93 and the like for each IoT service to be provided. Alternatively, a plurality of IoT services may be provided in one IoT core network.

The IoT services may include various services such as services for managing smart meters, services for controlling traffic, services related to government or emergency organizations, services for managing logistics, services for providing security, or services for managing inventory.

Further, each of the server apparatus 81, the server apparatus 82, and the server apparatus 83 may be a server apparatus managed by a service provider who provides the IoT services. That is, it can also be said that the IoT core network 91 is the IoT core network to be provided to the service provider who manages the server apparatus 81. The IoT core network 92 and the IoT core network 93 are similar to the IoT core network 91.

The gateway apparatus 30 terminates the GTP message transmitted from the MME 21 and specifies a core network that transmits the GTP message from among a plurality of IoT core networks. The gateway apparatus 30 uses the DB 100 when it specifies the core network that transmits the GTP message.

The DB 100 manages the identification information of the UE 60 and the identification information of the IoT core network in which the UE 60 is registered in association with each other. The gateway apparatus 30 extracts the identification information of the IoT core network associated with the UE 60 from the DB 100 using the identification information of the UE 60 included in the GTP message. Further, the gateway apparatus 30 transmits the GTP message to the S-GW arranged in the specified IoT core network.

Figure 13:
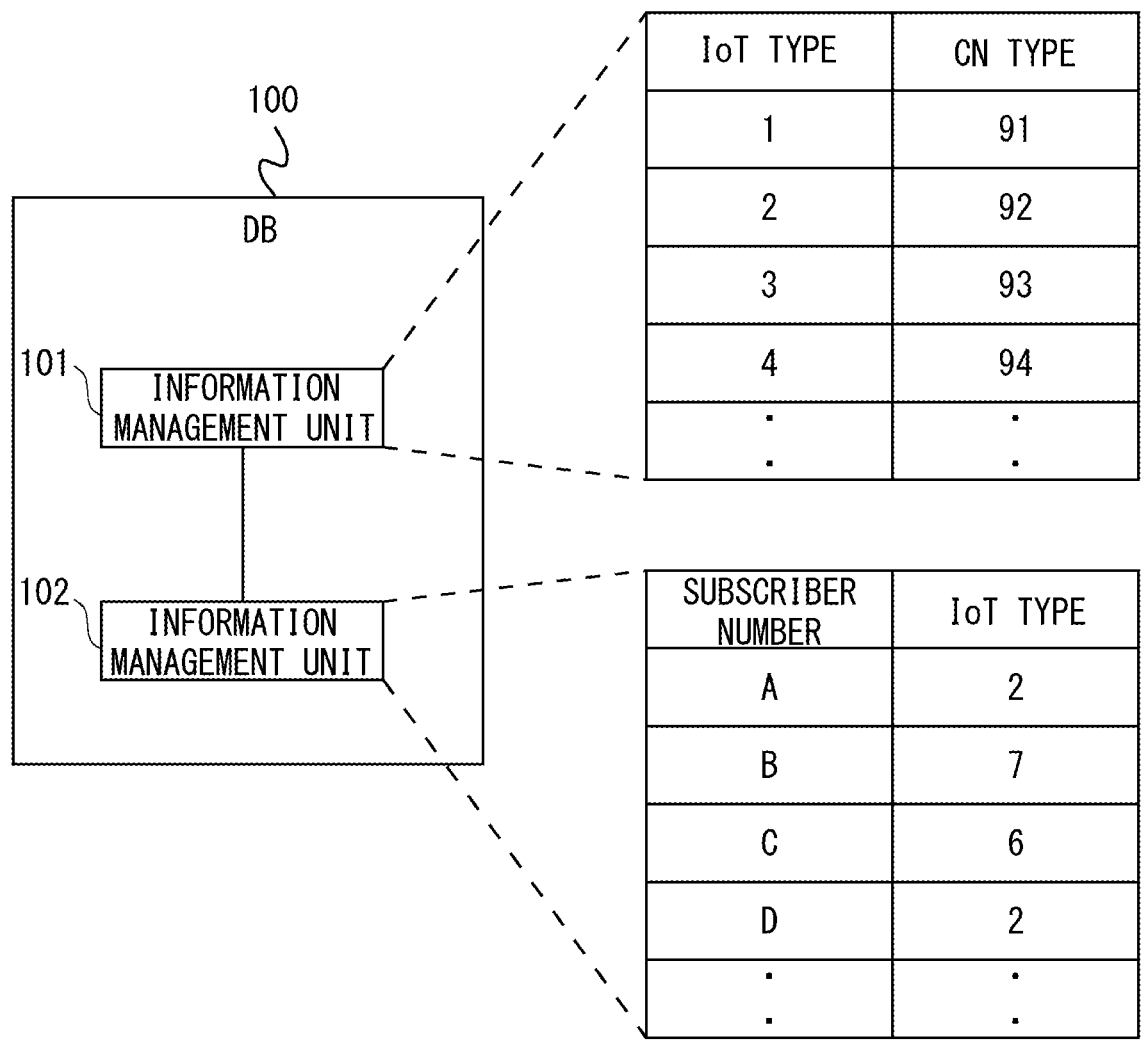
FIG. 13 is a diagram showing information managed by a DB according to the fifth example embodiment.

Referring next to FIG. 13, the information managed by the DB 100 will be explained. The DB 100 includes an information management unit 101 and an information management unit 102. Each of the information management unit 101 and the information management unit 102 may be a memory or the like in the DB 100 and may be an external memory or the like attached to the DB 100.

The information management unit 101 manages the information regarding the IoT type and the information regarding the core network (CN) type in association with each other. The information regarding the IoT type may be, for example, information for identifying the IoT services. In FIG. 13, numerals like 1 to 4 are used as the information regarding the IoT type. Further, the information regarding the CN type is information for identifying the IoT core network. In FIG. 13, numerals like 91 to 93 added for each IoT core network in FIG. 12 are used as the information regarding the CN type.

The information management unit 102 manages the information regarding a subscriber number and the information regarding the IoT type in association with each other. The information regarding the subscriber number may be, for example, the telephone number, the machine number or the like allocated to the UE 60. Alternatively, the information regarding the subscriber number may be International Mobile Subscriber Identity (IMSI). In FIG. 13, characters like A-D are used as the information regarding the subscriber number.

Further, the information managed in the DB 100 may be managed in a plurality of apparatuses in a distributed manner. The information managed in the information management unit 102 may be managed by, for example, a Home Subscriber Server (HSS) or a Home Location Register (HLR) that arranged in the core network and manages subscriber information.

Figure 14:
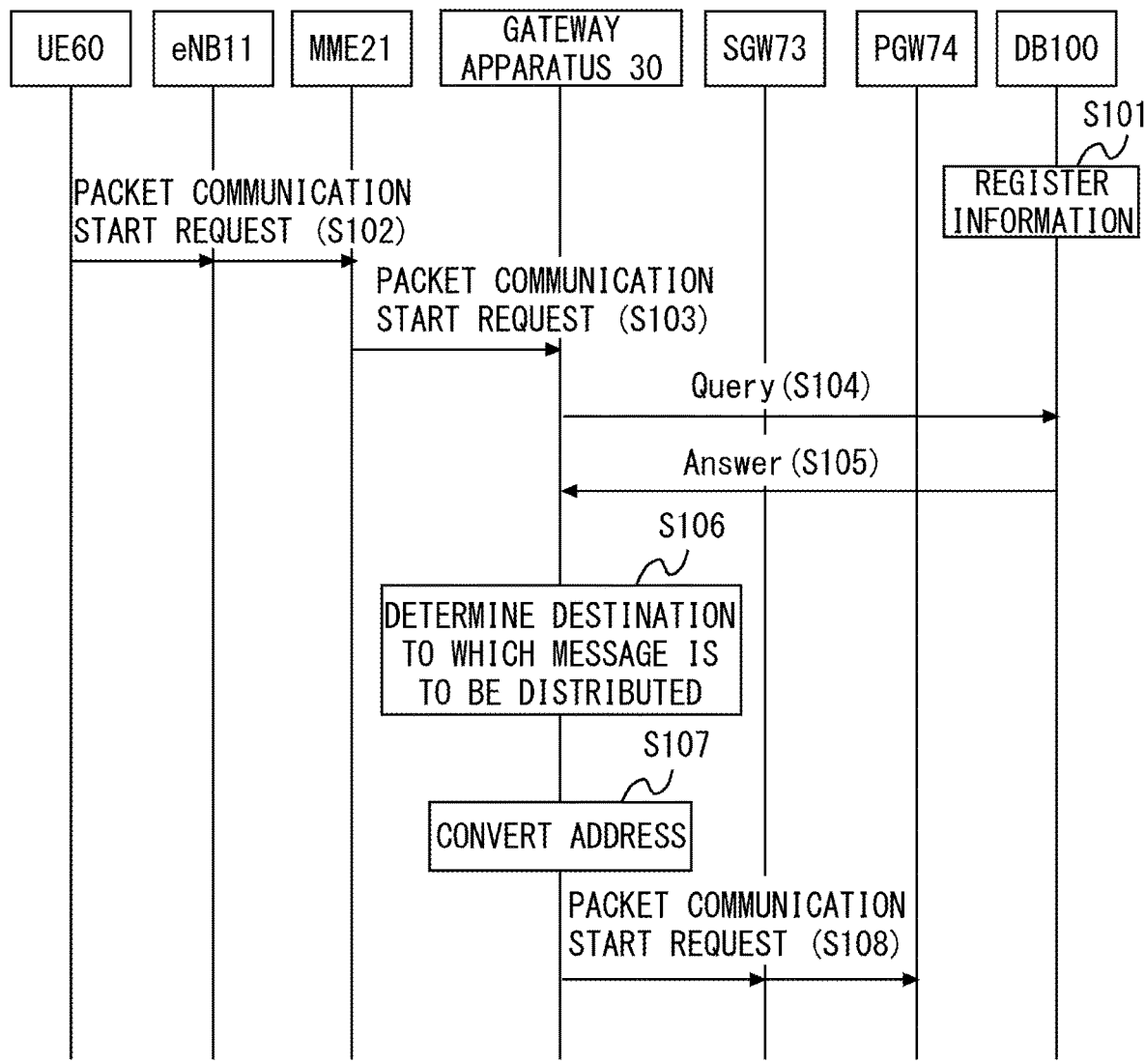
FIG. 14 is a diagram showing a flow of packet allocation processing according to the fifth example embodiment.

Referring next to FIG. 14, a flow of packet allocation processing according to the fifth example embodiment of the present disclosure will be explained. First, the information shown in FIG. 13 is registered in the DB 100 (S101). The DB 100 may acquire, for example, the information shown in FIG. 13 from another server apparatus or the like, or receive the information shown in FIG. 13 from a user or the like who manages the DB 100.

Next, the UE 60 transmits a packet communication start request message to the MME 21 via the eNB 11 in order to start packet communication (S102). The UE 60 sets the subscriber number in the packet communication start request message. In this example, it is assumed that the UE 60 has set a subscriber number A in the packet communication start request message. Next, the MME 21 transmits the packet communication start request message, which is the GTP message, to the gateway apparatus 30 (S103). The subscriber number A is set in the packet communication start request message, which is the GTP message.

Next, the gateway apparatus 30 terminates the packet communication start request message, which is the GTP message transmitted from the MME 21, and extracts the subscriber number of the UE 60. Further, the gateway apparatus 30 transmits a Query message in which the extracted subscriber number A is set to the DB 100 (S104). Upon receiving the Query message in which the subscriber number is set, the DB 100 specifies the IoT type associated with the subscriber number using the information management unit 102. Further, the DB 100 specifies the CN type associated with the IoT type using the information management unit 101. Since the subscriber number A is set in the Query message in this example, the DB 100 specifies IoT type: 2 and CN type: 92.

Next, the DB 100 transmits an Answer message in which CN type: 92 is set to the gateway apparatus 30 (S105). Next, the gateway apparatus 30 determines the destination to which the packet communication start request message is to be distributed (S106). In other words, the gateway apparatus 30 determines the destination of the packet communication start request message. The gateway apparatus 30 determines to transmit the packet communication start request message to the S-GW 73 arranged in the IoT core network 92 that corresponds to CN type: 92 set in the Answer message.

Next, the gateway apparatus 30 changes the transmission source address of the packet communication start request message, which is the GTP message to be transmitted to the S-GW 73, from the identifier of the MME 21 to the identifier of the gateway apparatus 30 (S107). Since the address conversion processing shown in Step S107 is similar to the address conversion processing in Steps S14 and S17 shown in FIG. 3, detailed descriptions thereof will be omitted.

Next, the gateway apparatus 30 transmits the packet communication start request message to the S-GW 73

(S108). Further, the S-GW 73 transmits the received packet communication start request message to the P-GW 74 (S108).

As described above, by using the communication system according to the fifth example embodiment of the present disclosure, when the IoT core networks separated from each other for each IoT service are present, the gateway apparatus 30 is able to relay the data regarding the UE 60 to the IoT core network that transmits the data regarding the IoT service that the UE 60 uses.

Figure 15:
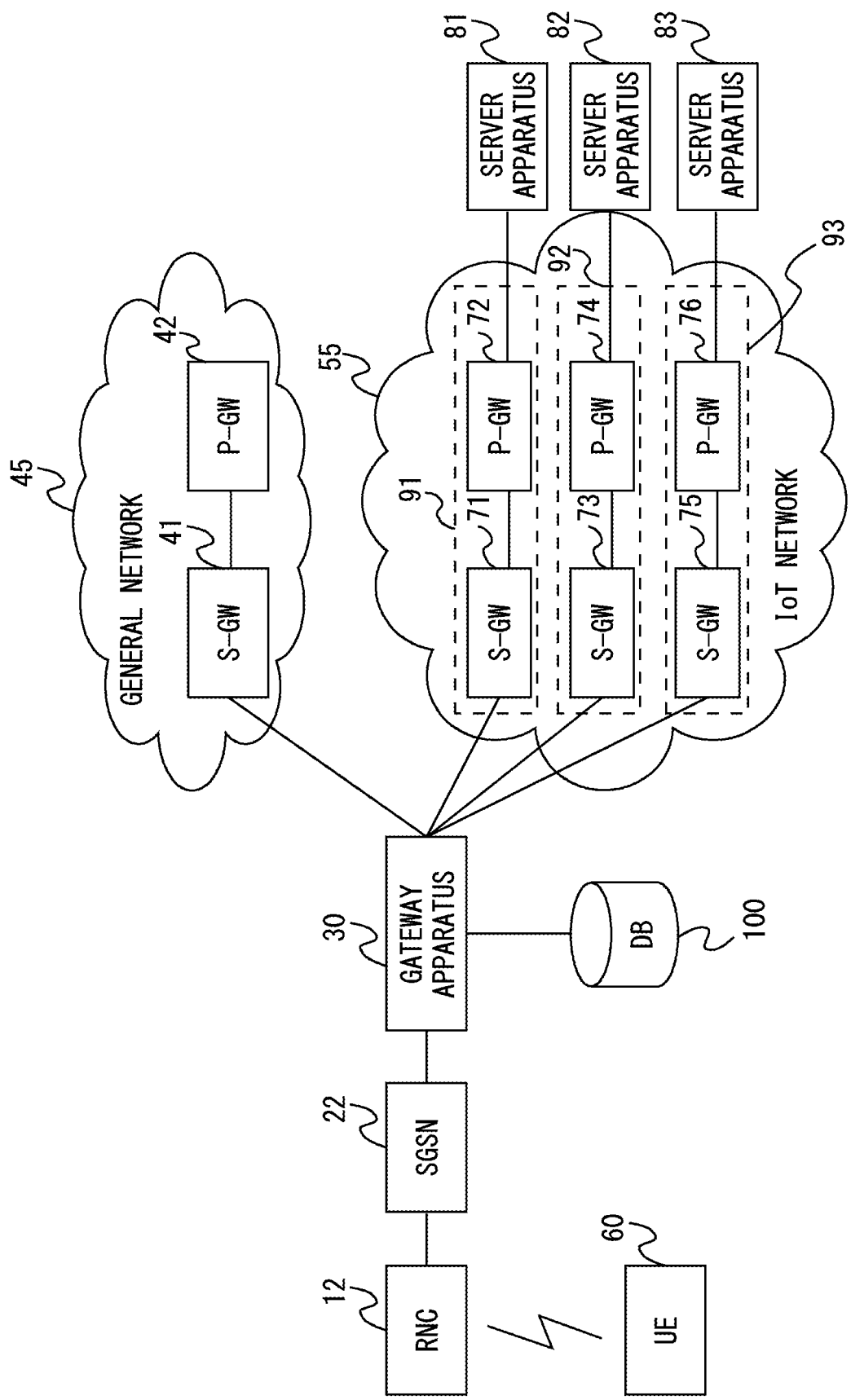
FIG. 15 is a configuration example of the communication system according to the fifth example embodiment.

Further, in the fifth example embodiment, as shown in FIG. 15, the RNC 12 may be used in place of the eNB 11 and the SGSN 22 may be used in place of the MME 21.

Further, in the first to fourth example embodiments as well, as described in the fifth example embodiment, the gateway apparatus 30 may determine the destination to which the message is to be distributed using the DB 100.

Further, when the information managed in the information management unit 102 is managed in the HSS, the DB 100 transmits the Query message received in Step S104 to the HSS. The HSS specifies the IoT type associated with the subscriber number set in the Query message. Next, the HSS transmits, to the DB 100, the message in which the specified IoT type is set. The DB 100 specifies the CN type associated with the IoT type set in the message.

Sixth Example Embodiment

Figure 16:
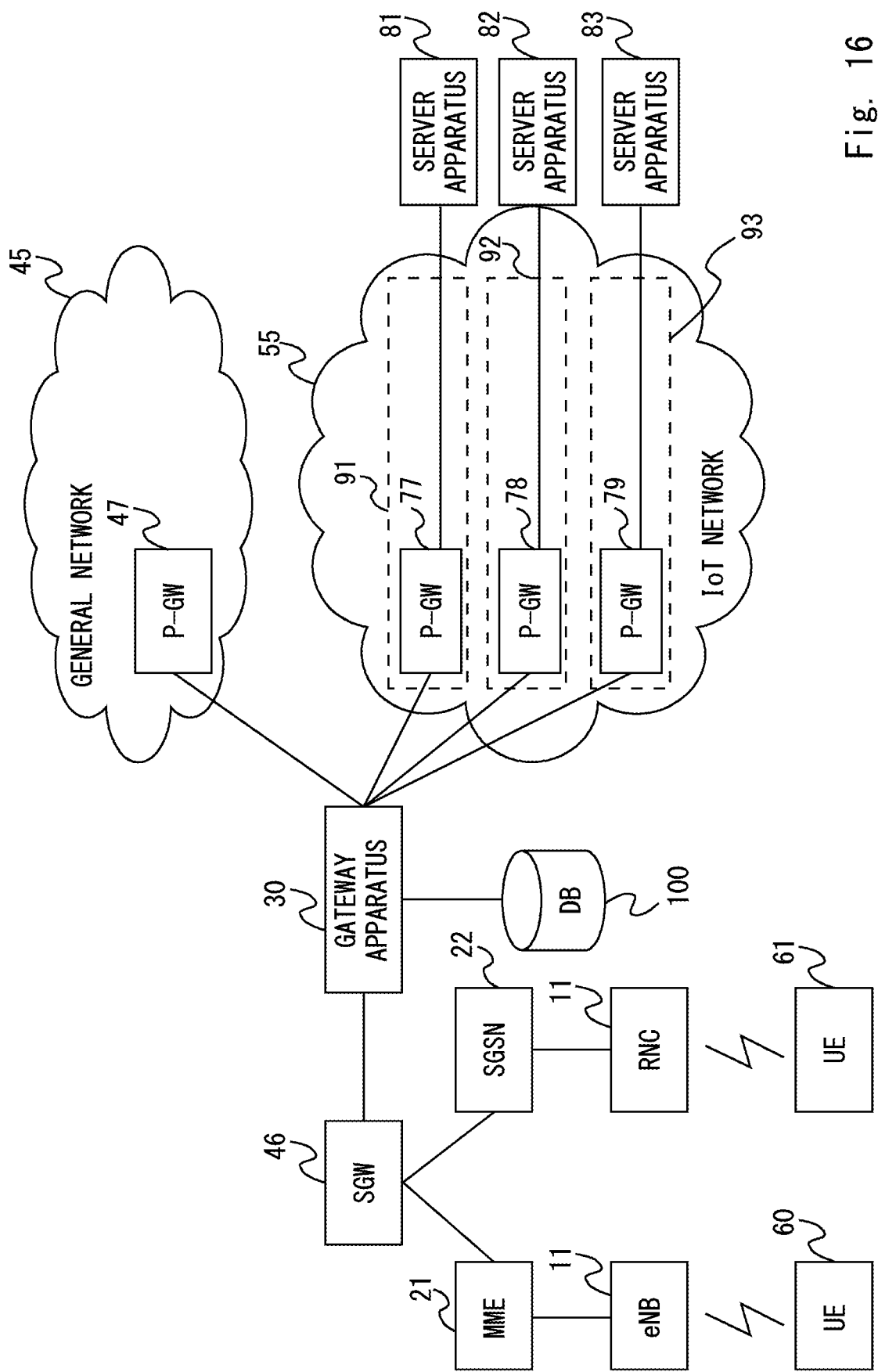
FIG. 16 is a configuration example of a communication system according to a sixth example embodiment.

Referring next to FIG. 16, a configuration example of a communication system according to a sixth example embodiment of the present disclosure will be explained. In the communication system shown in FIG. 16, a database (DB) 100 is added to the communication system shown in FIG. 6. Further, an IoT core network 91, an IoT core network 92, and an IoT core network 93 are present in the IoT network 55, a P-GW 77 is arranged in the IoT core network 91, a P-GW 78 is arranged in the IoT core network 92, and a P-GW 79 is arranged in the IoT core network 93. Further, a server apparatus 81 is connected to the P-GW 77, a server apparatus 82 is connected to the P-GW 78, and a server apparatus 83 is connected to the P-GW 79.

The gateway apparatus 30 terminates the GTP message transmitted from the S-GW 46 and specifies the core network that transmits the GTP message from among a plurality of IoT core networks. The gateway apparatus 30 uses the DB 100 when it specifies the core network that transmits the GTP message.

The DB 100 manages the identification information of the UE 60 and the identification information of the IoT core network in which the UE 60 is registered in association with each other. Further, the DB 100 manages the identification information of the UE 61 and the identification information of the IoT core network in which the UE 61 is registered in association with each other. The gateway apparatus 30 extracts the identification information of the IoT core network associated with the UE 60 or UE 61 from the DB 100 using the identification information of the UE 60 or UE 61 included in the GTP message. Further, the gateway apparatus 30 transmits the GTP message to the P-GW arranged in the specified IoT core network.

Figure 17:
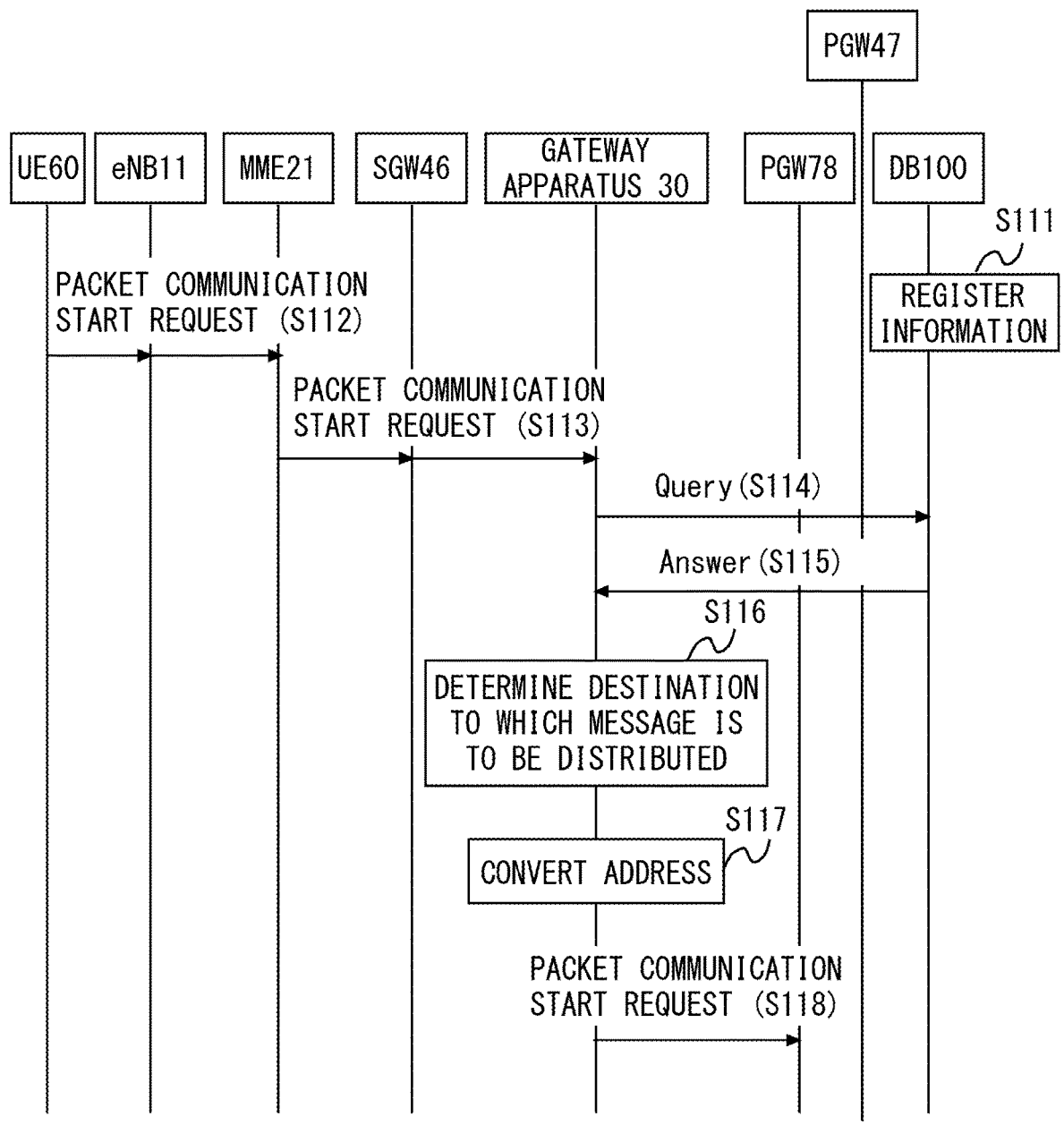
FIG. 17 is a diagram showing a flow of packet allocation processing according to the sixth example embodiment.

Referring next to FIG. 17, a flow of packet allocation processing according to the sixth example embodiment of the present disclosure will be explained. Since the processing shown in Step S111 is similar to that of Step S101 shown in FIG. 14, detailed descriptions thereof will be omitted.

Next, the UE 60 transmits a packet communication start request message to the MME 21 via the eNB 11 in order to start packet communication (S112). The UE 60 sets the subscriber number in the packet communication start request message. In this example, it is assumed that the UE 60 has set a subscriber number A in the packet communication start request message. Next, the MME 21 transmits the packet communication start request message, which is the GTP message, to the gateway apparatus 30 via the S-GW 46 (S113). The subscriber number A is set in the packet communication start request message, which is the GTP message.

Next, the gateway apparatus 30 terminates the packet communication start request message, which is the GTP message transmitted from the S-GW 46, and extracts the subscriber number of the UE 60. Further, the gateway apparatus 30 transmits the Query message in which the extracted subscriber number A is set to the DB 100 (S114). Upon receiving the Query message in which the subscriber number is set, the DB 100 specifies the IoT type associated with the subscriber number using the information management unit 102. Further, the DB 100 specifies the CN type associated with the IoT type using the information management unit 101. Since the subscriber number A is set in the Query message in this example, the DB 100 specifies IoT type: 2 and CN type: 92.

Next, the DB 100 transmits the Answer message in which CN type: 92 is set to the gateway apparatus 30 (S115). Next, the gateway apparatus 30 determines the destination to which the packet communication start request message is to be distributed (S116). In other words, the gateway apparatus 30 determines the destination of the packet communication start request message. The gateway apparatus 30 determines to transmit the packet communication start request message to the S-GW 78 arranged in the IoT core network 92 that corresponds to CN type: 92 set in the Answer message.

Next, the gateway apparatus 30 changes the transmission source address of the packet communication start request message, which is the GTP message to be transmitted to the P-GW 78, from the identifier of the S-GW 46 to the identifier of the gateway apparatus 30 (S117). Since the address conversion processing shown in Step S117 is similar to the address conversion processing in Steps S44 and S47 shown in FIG. 7, detailed descriptions thereof will be omitted.

Next, the gateway apparatus 30 transmits the packet communication start request message to the P-GW 78 (S118).

Note that the processing for distributing the packet communication start request message regarding the UE 61 in FIG. 16 can be executed by replacing the eNB 11 shown in FIG. 17 by the RNC 12 and replacing the MME 21 by the SGSN 22.

As described above, by using the communication system according to the sixth example embodiment of the present disclosure, when the IoT core networks separated from each other for each IoT service are present, the gateway apparatus 30 is able to relay the data regarding the UE 60 to the IoT core network that transmits the data regarding the IoT service that the UE 60 uses.

Seventh Example Embodiment

Figure 18:
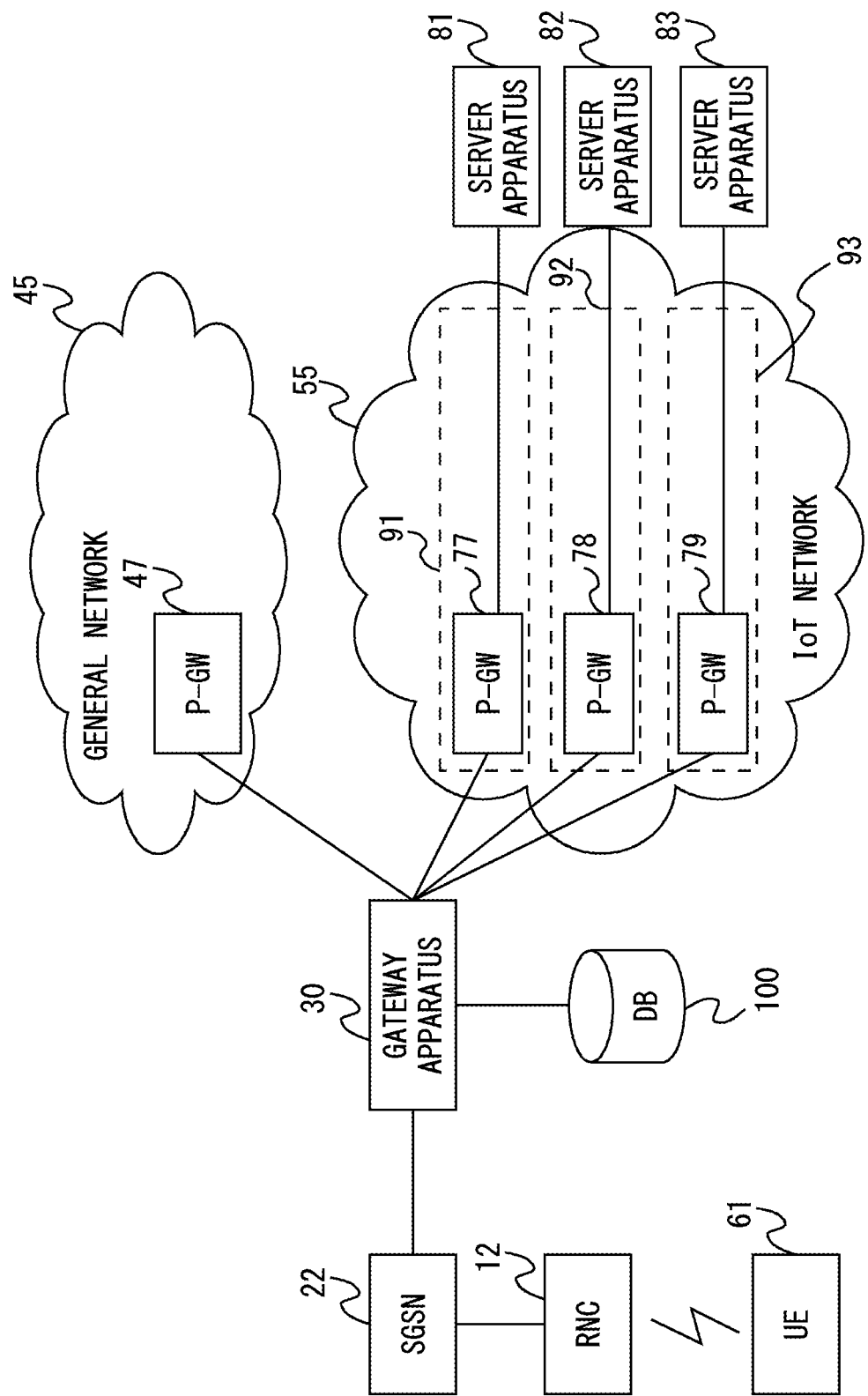
FIG. 18 is a configuration example of a communication system according to a seventh example embodiment.

Referring next to FIG. 18, a configuration example of a communication system according to a seventh example embodiment of the present disclosure will be explained. In the communication system shown in FIG. 18, a database (DB) 100 is added to the communication system shown in FIG. 9. Further, an IoT core network 91, an IoT core network 92, and an IoT core network 93 are present in the IoT network 55, a P-GW 77 is arranged in the IoT core network 91, a P-GW 78 is arranged in the IoT core network 92, and a P-GW 79 is arranged in the IoT core network 93. Further, a server apparatus 81 is connected to the P-GW 77, a server apparatus 82 is connected to the P-GW 78, and a server apparatus 83 is connected to the P-GW 79.

The gateway apparatus 30 terminates the GTP message transmitted from the SGSN 22 and specifies the core network that transmits the GTP message from among the plurality of IoT core networks. The gateway apparatus 30 uses the DB 100 when it specifies the core network that transmits the GTP message.

The DB 100 manages the identification information of the UE 61 and the identification information of the IoT core network in which the UE 61 is registered in association with each other. The gateway apparatus 30 extracts the identification information of the IoT core network associated with the UE 61 from the DB 100 using the identification information of the UE 61 included in the GTP message. Further, the gateway apparatus 30 transmits the GTP message to the P-GW arranged in the specified IoT core network.

Figure 19:
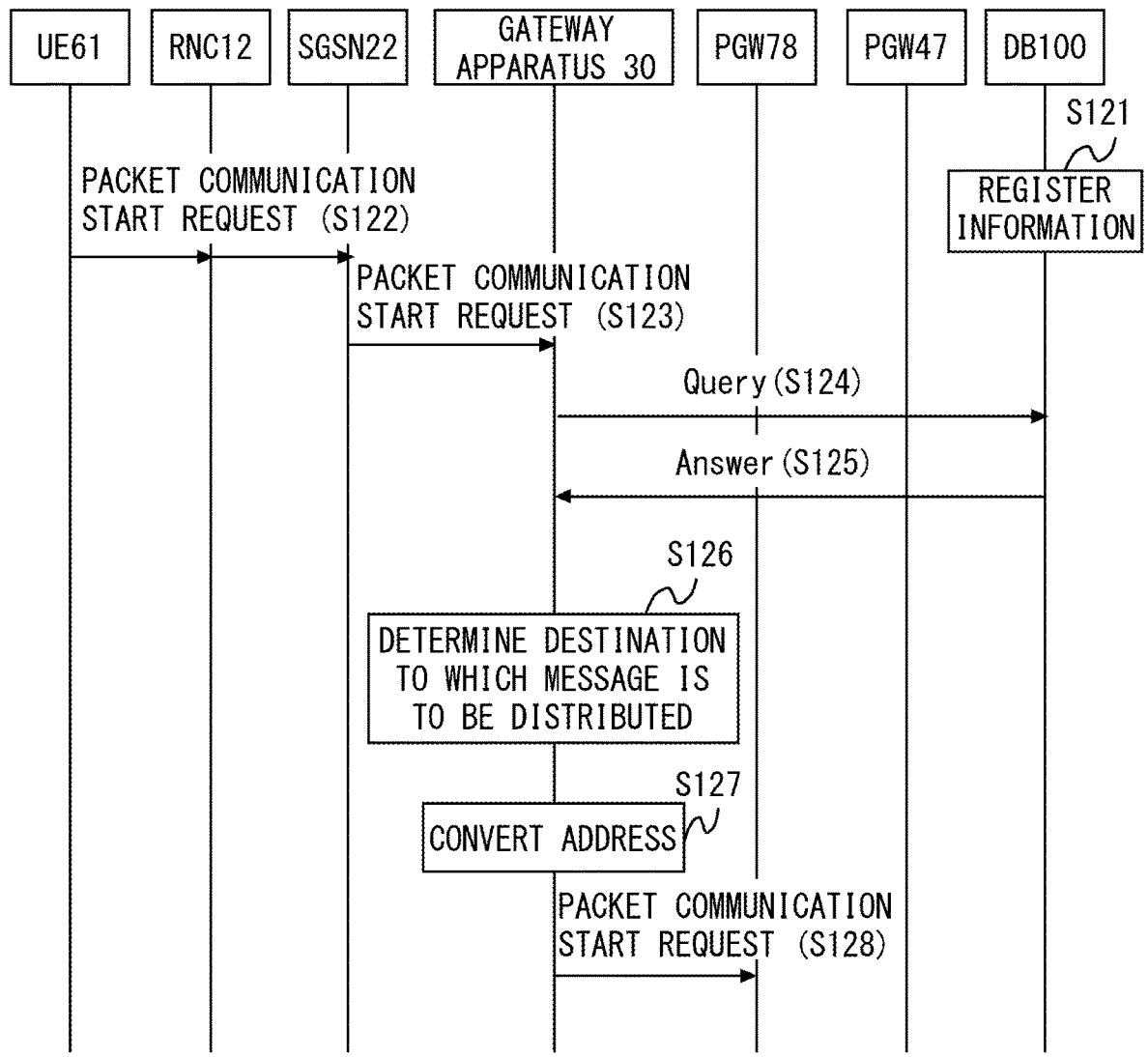
FIG. 19 is a diagram showing a flow of packet allocation processing according to the seventh example embodiment.

Referring next to FIG. 19, a flow of packet allocation processing according to the seventh example embodiment of the present disclosure will be explained. Since the processing shown in Step S121 is similar to that of Step S101 shown in FIG. 14, detailed descriptions thereof will be omitted.

Next, the UE 61 transmits a packet communication start request message to the SGSN 22 via the RNC 12 in order to start packet communication (S122). The UE 61 sets the subscriber number in the packet communication start request message. In this example, it is assumed that the UE 61 has set a subscriber number A in the packet communication start request message. Next, the SGSN 22 transmits the packet communication start request message, which is the GTP message, to the gateway apparatus 30 (S123). The subscriber number A is set in the packet communication start request message, which is the GTP message.

Next, the gateway apparatus 30 terminates the packet communication start request message, which is the GTP message transmitted from the SGSN 22, and extracts the subscriber number of the UE 61. Further, the gateway apparatus 30 transmits a Query message in which the extracted subscriber number A is set to the DB 100 (S124). Upon receiving the Query message in which the subscriber number is set, the DB 100 specifies the IoT type associated with the subscriber number using the information management unit 102. Further, the DB 100 specifies the CN type associated with the IoT type using the information management unit 101. Since the subscriber number A is set in the Query message in this example, the DB 100 specifies IoT type: 2 and CN type: 92.

Next, the DB 100 transmits an Answer message in which CN type: 92 is set to the gateway apparatus 30 (S125). Next, the gateway apparatus 30 determines the destination to which the packet communication start request message is to be distributed (S126). In other words, the gateway apparatus 30 determines the destination of the packet communication start request message. The gateway apparatus 30 determines to transmit the packet communication start request message to the P-GW 78 arranged in the IoT core network 92 that corresponds to CN type: 92 set in the Answer message.

Next, the gateway apparatus 30 changes the transmission source address of the packet communication start request message, which is the GTP message to be transmitted to the P-GW 78, from the identifier of the SGSN 22 to the identifier of the gateway apparatus 30 (S127). Since the address conversion processing in Step S127 is similar to the address conversion processing in Steps S74 an S77 shown in FIG. 10, detailed descriptions thereof will be omitted.

Next, the gateway apparatus 30 transmits the packet communication start request message to the P-GW 78 (S128).

As described above, by using the communication system according to the seventh example embodiment of the present disclosure, when the IoT core networks separated from each other for each IoT service are present, the gateway apparatus 30 is able to relay the data regarding the UE 61 to the IoT core network that transmits data regarding the IoT service used by the UE 61.

Figure 20:
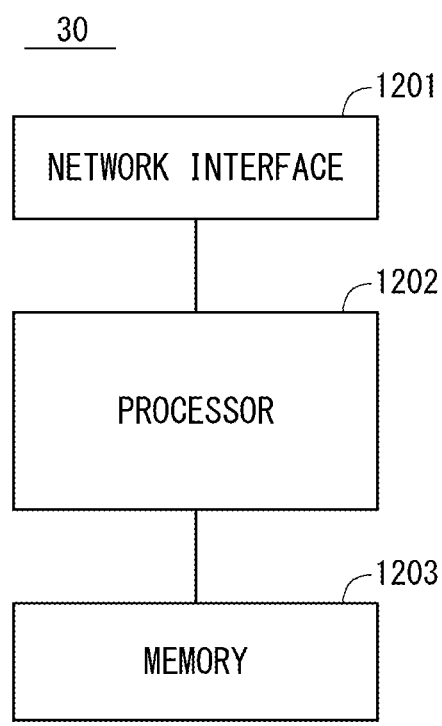
FIG. 20 is a configuration example of a gateway apparatus according to each of the example embodiments.

FIG. 20 is a block diagram showing a configuration example of the gateway apparatus 30. Referring to FIG. 20, the gateway apparatus 30 includes a network interface 1201, a processor 1202, and a memory 1203. The network interface 1201 is used to communicate with a network node (e.g., eNB, MME, P-GW). The network interface 1201 may include, for example, a network interface card (NIC) conforming to the IEEE 802.3 series.

The processor 1202 loads software (computer program) from the memory 1203 and executes the loaded software, thereby performing the processing of the gateway apparatus 30 described with reference to the sequence diagram and flowcharts in the aforementioned example embodiments. The processor 1202 may be, for example, a microprocessor, an MPU, or a CPU. The processor 1202 may include a plurality of processors.

The memory 1203 is composed of a combination of a volatile memory and a non-volatile memory. The memory 1203 may include a storage that is located apart from the processor 1202. In this case, the processor 1202 may access the memory 1203 via an I/O interface (not shown).

In the example shown in FIG. 20, the memory 1203 is used to store software modules. The processor 1202 loads these software modules from the memory 1203 and executes these loaded software modules, thereby performing the processing of the gateway apparatus 30 described in the aforementioned example embodiments.

As described above with reference to FIG. 20, each of the processors included in the gateway apparatus 30 according to the aforementioned example embodiments executes one or more programs including instructions to cause a computer to perform an algorithm described with reference to the drawings.

In the aforementioned examples, the program(s) can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.). The program(s) may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

The present disclosure is not limited to the aforementioned example embodiments and may be changed as appropriate without departing from the spirit of the present disclosure.

While the present disclosure has been described with reference to the example embodiments, the present disclosure is not limited to the aforementioned example embodiments. Various changes that can be understood by those skilled in the art can be made to the configurations and the details of the present disclosure within the scope of the present disclosure.

For example, some or all of the example embodiments disclosed above can be described as, but not limited to, the following supplementary notes.

(Supplementary Note 1)

A gateway apparatus arranged between a node apparatus configured to execute communication in accordance with a General Packet Radio Service (GPRS) Tunneling Protocol (GTP) and a Serving-Gateway (S-GW) or between a node apparatus configured to execute communication in accordance with the GTP and a Packet Data Network (PDN)-Gateway (P-GW), the apparatus comprising:

a communication unit configured to terminate a GTP message transmitted from the node apparatus;

a determination unit configured to determine a terminal type of a mobile station associated with the GTP message; and a conversion unit configured to change a transmission source address set in the GTP message transmitted from the node apparatus from an identifier of the node apparatus to a first identifier of the gateway apparatus, wherein the communication unit transmits, to the S-GW or the P-GW determined in accordance with the terminal type, the GTP message in which the transmission source address has been converted.

(Supplementary Note 2)

The gateway apparatus according to Supplementary Note 1, wherein the determination unit determines the terminal type of the mobile station using the GTP message transmitted in Attach processing of the mobile station, and, the communication unit transmits the GTP message to the S-GW or the P-GW arranged in a registration network of the mobile station defined in accordance with the terminal type.

(Supplementary Note 3)

The gateway apparatus according to Supplementary Note 1 or 2, wherein the conversion unit changes the transmission source address set in the GTP message transmitted from the S-GW or the P-GW from an identifier of the S-GW or the P-GW to a second identifier of the gateway apparatus, manages the identifier of the node apparatus and the first identifier in association with each other, and further manages the identifier of the S-GW or the P-GW and the second identifier in association with each other, and the communication unit transmits a GTP message in which the destination has been changed to the identifier of the node apparatus to the node apparatus when the communication unit has received a GTP message whose destination is the first identifier from the S-GW or the P-GW, and transmits a GTP message in which the destination has been changed to the identifier of the S-GW or the P-GW to the S-GW or the P-GW when the communication unit has received a GTP message whose destination is the second identifier from the node apparatus.

(Supplementary Note 4)

The gateway apparatus according to Supplementary Note 3, wherein each of the identifier of the node apparatus, the identifier of the S-GW or the P-GW, the first identifier, and the second identifier is a Tunnel Endpoint Identifier (TEID) that identifies a tunnel used to transmit a control message.

(Supplementary Note 5)

The gateway apparatus according to Supplementary Note 4, wherein the conversion unit converts a TEID that is included in the GTP message transmitted from the node apparatus and identifies the tunnel used to transmit the user data from a TEID that identifies the node apparatus to a TEID that identifies the gateway apparatus, and converts a TEID that is included in the GTP message transmitted from the S-GW or the P-GW and identifies the tunnel used to transmit the user data from a TEID that identifies the S-GW or the P-GW to a TEID that identifies the gateway apparatus.

(Supplementary Note 6)

The gateway apparatus according to Supplementary Note 3, wherein the conversion unit cancels, when the conversion unit has received a release indication message of a session between the node apparatus and the S-GW or a release indication message of a session between the node apparatus and the P-GW, the association between the identifier of the node apparatus and the first identifier and further the association between the identifier of the S-GW or the P-GW and the second identifier.

(Supplementary Note 7)

A communication method in a gateway apparatus arranged between a node apparatus configured to execute communication in accordance with a General Packet Radio Service (GPRS) Tunneling Protocol (GTP) and a Serving-Gateway (S-GW) or between a node apparatus configured to execute communication in accordance with the GTP and a Packet Data Network (PDN)-Gateway (P-GW), the method comprising:

terminating a GTP message transmitted from the node apparatus;

determining a terminal type of a mobile station associated with the GTP message;

changing a transmission source address set in the GTP message transmitted from the node apparatus from an identifier of the node apparatus to a first identifier of the gateway apparatus; and transmitting, to the S-GW or the P-GW determined in accordance with the terminal type, the GTP message in which the transmission source address has been converted.

(Supplementary Note 8)

A program for causing a computer, which is a gateway apparatus arranged between a node apparatus configured to execute communication in accordance with a General Packet Radio Service (GPRS) Tunneling Protocol (GTP) and a Serving-Gateway (S-GW) or between a node apparatus configured to execute communication in accordance with the GTP and a Packet Data Network (PDN)-Gateway (P-GW), the program causing the computer to execute the following processing of:

terminating a GTP message transmitted from the node apparatus;

determining a terminal type of a mobile station associated with the GTP message;

changing a transmission source address set in the GTP message transmitted from the node apparatus from an identifier of the node apparatus to a first identifier of the gateway apparatus; and transmitting, to the S-GW or the P-GW determined in accordance with the terminal type, the GTP message in which the transmission source address has been converted.

REFERENCE SIGNS LIST

10 RAN APPARATUS
11 eNB
12 RNC
20 NODE APPARATUS
21 MME
22 SGSN
30 GATEWAY APPARATUS
31 COMMUNICATION UNIT
32 DETERMINATION UNIT
33 CONVERSION UNIT
40 S/P-GW
41 S-GW
42 P-GW
45 GENERAL NETWORK
46 S-GW
47 P-GW
50 S/P-GW
51 S-GW
52 P-GW
55 IoT NETWORK
57 P-GW
60 UE
61 UE
71 S-GW
72 P-GW
73 S-GW
74 P-GW
75 S-GW
75 P-GW
76 P-GW
77 P-GW
78 P-GW
81 SERVER APPARATUS
82 SERVER APPARATUS
83 SERVER APPARATUS
84 SERVER APPARATUS
91 IoT CORE NETWORK
92 IoT CORE NETWORK
93 IoT CORE NETWORK
100 DB
101 INFORMATION MANAGEMENT UNIT
102 INFORMATION MANAGEMENT UNIT

The invention claimed is:

1. A gateway apparatus arranged between a node apparatus configured to execute communication in accordance with a General Packet Radio Service (GPRS) Tunneling Protocol (GTP) and a Serving-Gateway (S-GW) or between a node apparatus configured to execute communication in accordance with the GTP and a Packet Data Network (PDN)-Gateway (P-GW), the apparatus comprising:
at least one memory storing instructions, and
at least one processor configured to execute the instructions to;
terminate a GTP message transmitted from the node apparatus;
determine a terminal type of a mobile station associated with the GTP message;
change a transmission source address set in the GTP message transmitted from the node apparatus from an identifier of the node apparatus to a first identifier of the gateway apparatus, and
transmit, to the S-GW or the P-GW determined in accordance with the terminal type, the GTP message in which the transmission source address has been converted.

2. The gateway apparatus according to claim 1, wherein the at least one processor is further configured to execute the instructions to determine the terminal type of the mobile station using the GTP message transmitted in Attach processing of the mobile station, and
transmit the GTP message to the S-GW or the P-GW arranged in a registration network of the mobile station defined in accordance with the terminal type.

3. The gateway apparatus according to claim 1, wherein the at least one processor is further configured to execute the instructions to change the transmission source address set in the GTP message transmitted from the S-GW or the P-GW from an identifier of the S-GW or the P-GW to a second identifier of the gateway apparatus, manage the identifier of the node apparatus and the first identifier in association with each other, and further manage the identifier of the S-GW or the P-GW and the second identifier in association with each other, and
transmit a GTP message in which the destination has been changed to an identifier of the node apparatus to the node apparatus when a GTP message whose destination is the first identifier from the S-GW or the P-GW has been received, and transmit a GTP message in which the destination has been changed to the identifier of the S-GW or the P-GW to the S-GW or the P-GW when a GTP message whose destination is the second identifier from the node apparatus has been received.

4. The gateway apparatus according to claim 3, wherein each of the identifier of the node apparatus, the identifier of the S-GW or the P-GW, the first identifier, and the second identifier is a Tunnel Endpoint Identifier (TEID) that identifies a tunnel used to transmit a control message.

5. The gateway apparatus according to claim 4, wherein the at least one processor is further configured to execute the instructions to convert a TEID that is included in the GTP message transmitted from the node apparatus and identify the tunnel used to transmit the user data from a TEID that identifies the node apparatus to a TEID that identifies the gateway apparatus, and convert a TEID that is included in the GTP message transmitted from the S-GW or the P-GW and identify the tunnel used to transmit the user data from a TEID that identifies the S-GW or the P-GW to a TEID that identifies the gateway apparatus.

6. The gateway apparatus according to claim 3, wherein the at least one processor is further configured to execute the instructions to cancel, when a release indication message of a session between the node apparatus and the S-GW or a release indication message of a session between the node apparatus and the P-GW has been received, the association between the identifier of the node apparatus and the first identifier and further the association between the identifier of the S-GW or the P-GW and the second identifier.

7. A communication method in a gateway apparatus arranged between a node apparatus configured to execute communication in accordance with a General Packet Radio Service (GPRS) Tunneling Protocol (GTP) and a Serving-Gateway (S-GW) or between a node apparatus configured to execute communication in accordance with the GTP and a Packet Data Network (PDN)-Gateway (P-GW), the method comprising:
terminating a GTP message transmitted from the node apparatus;
determining a terminal type of a mobile station associated with the GTP message;

changing a transmission source address set in the GTP message transmitted from the node apparatus from an identifier of the node apparatus to a first identifier of the gateway apparatus; and transmitting, to the S-GW or the P-GW determined in accordance with the terminal type, the GTP message in which the transmission source address has been converted.

8. A non-transitory computer readable medium storing a program for causing a computer, which is a gateway apparatus arranged between a node apparatus configured to execute communication in accordance with a General Packet Radio Service (GPRS) Tunneling Protocol (GTP) and a Serving-Gateway (S-GW) or between a node apparatus configured to execute communication in accordance with the GTP and a Packet Data Network (PDN)-Gateway (P-GW), the program causing the computer to execute the following processing of:

terminating a GTP message transmitted from the node apparatus;

determining a terminal type of a mobile station associated with the GTP message;

changing a transmission source address set in the GTP message transmitted from the node apparatus from an identifier of the node apparatus to a first identifier of the gateway apparatus; and transmitting, to the S-GW or the P-GW determined in accordance with the terminal type, the GTP message in which the transmission source address has been converted.

* * * * *